(12) United States Patent
Sahm

(10) Patent No.: US 12,460,762 B2
(45) Date of Patent: Nov. 4, 2025

(54) VALVE EVACUATION APPARATUS, CONTROL, AND ASSOCIATED METHODS

(71) Applicant: TPE MIDSTREAM LLC, Tulsa, OK (US)

(72) Inventor: Douglas A. Sahm, Lutz, FL (US)

(73) Assignee: TPE MIDSTREAM LLC, Tulsa, OK (US)

( * ) Notice: Subject to any disclaimer, the term of this patent is extended or adjusted under 35 U.S.C. 154(b) by 202 days.

(21) Appl. No.: 18/042,177

(22) PCT Filed: Sep. 2, 2021

(86) PCT No.: PCT/US2021/048902
§ 371 (c)(1),
(2) Date: Feb. 17, 2023

(87) PCT Pub. No.: WO2022/051525
PCT Pub. Date: Mar. 10, 2022

(65) Prior Publication Data
US 2023/0304620 A1    Sep. 28, 2023

Related U.S. Application Data

(60) Provisional application No. 63/125,761, filed on Dec. 15, 2020, provisional application No. 63/074,741, filed on Sep. 4, 2020.

(51) Int. Cl.
*F16L 55/07* (2006.01)
*F17D 1/04* (2006.01)
*F17D 5/00* (2006.01)

(52) U.S. Cl.
CPC ............... *F16L 55/07* (2013.01); *F17D 1/04* (2013.01); *F17D 5/005* (2013.01)

(58) Field of Classification Search
CPC .. F16L 55/07; F17D 5/005; F17D 1/04; F17D 1/00; F17D 5/00; F15B 3/00
See application file for complete search history.

(56) References Cited

U.S. PATENT DOCUMENTS

2010/0059128 A1   3/2010   Reck
2015/0285383 A1   10/2015  Stumbo et al.
(Continued)

FOREIGN PATENT DOCUMENTS

DE   29621038 U1   2/1997
EP   3006813 B1    2/2019
(Continued)

OTHER PUBLICATIONS

IP Australia, "Notice of acceptance for your patent application," issued in connection with Australian Patent Application No. 2021338355, dated Jan. 16, 2024, 4 pages.
(Continued)

*Primary Examiner* — Kelsey E Cary
(74) *Attorney, Agent, or Firm* — Hanley, Flight & Zimmerman, LLC

(57) ABSTRACT

An apparatus to evacuate fluid is disclosed herein. The example apparatus includes a vent fluidly coupled to a first location, and a valve evacuation system fluidly coupled between the vent and a second location, the valve evacuation system to compress fluid from the first location and pump the compressed fluid to the second location.

17 Claims, 16 Drawing Sheets

(56) References Cited

U.S. PATENT DOCUMENTS

| | | |
|---|---|---|
| 2015/0369033 A1 | 12/2015 | MacLenzie |
| 2017/0023184 A1* | 1/2017 | Borghesani ........ G05D 16/0404 |
| 2020/0056716 A1 | 2/2020 | Mentzel |
| 2021/0213494 A1* | 7/2021 | Allred, Jr. ............... B08B 9/055 |
| 2023/0304620 A1 | 9/2023 | Sahm |

FOREIGN PATENT DOCUMENTS

| | | |
|---|---|---|
| EP | 4208658 A1 | 7/2023 |
| JP | 1972034221 U | 2/1972 |
| JP | S4734221 U | 12/1972 |
| JP | 58214682 A1 | 12/1983 |
| JP | 10314689 A | 12/1998 |
| JP | 2002213680 A | 7/2002 |
| WO | 2022051525 A1 | 3/2022 |

OTHER PUBLICATIONS

United Kingdom Intellectual Property Office, "Examination Report under section 18(3)," issued in connection with U.K. Patent Application No. 2302977.0, dated Feb. 8, 2024, 2 pages.

Australian Government, IP Australia, "Notice of grant for your patent," issued in connection with Australian Patent Application No. 2021338355, dated May 9, 2024, 1 page.

Australian Government, IP Australia, "Standard Patent Certificate," issued in connection with Australian Patent Application No. 2021338355, dated May 9, 2024, 1 page.

United Kingdom Patent Office, "Intention to Grant under Section 18(4)," issued in connection with United Kingdom Patent Application No. GB2302977.0, dated Jul. 30, 2024, 2 pages.

Canadian Intellectual Property Office, "Examiner Requisition," issued in connection with Canadian Patent Application No. 3,159,829, issued on Aug. 23, 2023, 4 pages.

Dale Millward: "Emergency pipeline repair systems developed to facilitate pipeline repair of unpiggable defects", Internet Citation, Jan. 1, 2012, pp. 1-14, XP002754559.

European Patent Office, "Extended European Search Report," issued in connection with European Patent Application No. 21865125.5, dated Sep. 2, 2024, 8 pages.

United Kingdom Intellectual Property Office, "Notification of Grant," issued in connection with United Kingdom Patent Application No. GB2302977.0, dated Sep. 10, 2024, 2 pages.

European Patent Office, "Communication pursuant to Rules 70(2) and 70a(2) EPC," issued in connection with European Patent Application No. 21865125.5, dated Sep. 19, 2024, 1 page.

International Searching Authority, "International Search Report & Written Opinion," issued in connection with International Application No. PCT/US2021/048902, mailed on Dec. 20, 2021, 10 Pages.

International Searching Authority, "International Preliminary Report on Patentability," issued in connection with International Application No. PCT/US2021/048902, mailed on Mar. 16, 2023, 7 pages.

IP Australia, "Examination report No. 1," issued in connection with Australian Patent Application No. 2021338355, mailed on Jul. 11, 2023, 3 pages.

Saudi Authority for Intellectual Property, "Examination Report," issued in connection with Saudi Arabian application No. 523442814, dated Nov. 3, 2023, 12 pages. English machine translation included.

Saudi Authority for Intellectual Property, "Second Examination Report," issued in connection with PCT National Phase Application No. 523442814, mailed on Sep. 16, 2024, 7 pages, English translation included.

Saudi Authority for Intellectual Property, "First Examination Report," issued in connection with PCT National Phase Application No. 524452086, mailed on Sep. 29, 2024, 7 pages, English translation included.

United Arab Emirates Ministry of Economy, "Legal Examination Result," issued in connection with Application No. P6000503/2023, mailed on Nov. 4, 2024, 1 page, English translation included.

United Kingdom Intellectual Property Office, "Search Report," issued in connection with United Kingdom Patent Application No. GB2412761.5, dated Jan. 22, 2025, 3 pages.

United Kingdom Patent Office, "Examination Report and Notification of Intention to Grant under Section 18 (4)," issued in connection with United Kingdom Patent Application No. 2412761.5, dated Aug. 22, 2025, 2 pages.

Australian Government, IP Australia, "Examination report No. 1," issued in connection with Australian Patent No. 2024202479, dated Sep. 3, 2025, 5 pages.

* cited by examiner

VALVE EVACUATION APPARATUS, CONTROL, AND ASSOCIATED METHODS

RELATED APPLICATIONS

This patent arises from a U.S. National Stage Patent Application under U.S.C. 371 of PCT Patent Application No. PCT/US21/48902, titled "Valve Evacuation Apparatus, Control, and Associated Methods," filed Sep. 2, 2021, which claims priority to U.S. Provisional Application No. 63/074,741," titled "Valve Evacuation Apparatus, Control, and Associated Methods," filed Sep. 4, 2020, and U.S. Provisional Application No. 63/125,761, titled "Valve Evacuation Apparatus, Control, and Associated Methods," filed Dec. 15, 2020. PCT Patent Application No. PCT/US21/48902, U.S. Provisional Application No. 63/074,741, and U.S. Provisional Application No. 63/125,761 are hereby incorporated by reference in their entireties.

FIELD OF THE DISCLOSURE

This disclosure relates generally to valves, and, more particularly, to valve evacuation apparatus, control, and associated methods.

BACKGROUND

In a gas pipeline, a valve upstream of a section of pipe is closed while performing maintenance on the section of pipe. When closed, the valve prevents the flow of a fluid from a high-pressure region upstream of the valve to a low-pressure region downstream from the valve. In some cases, some fluid can leak through one or more seals of the valve.

Figure 1:
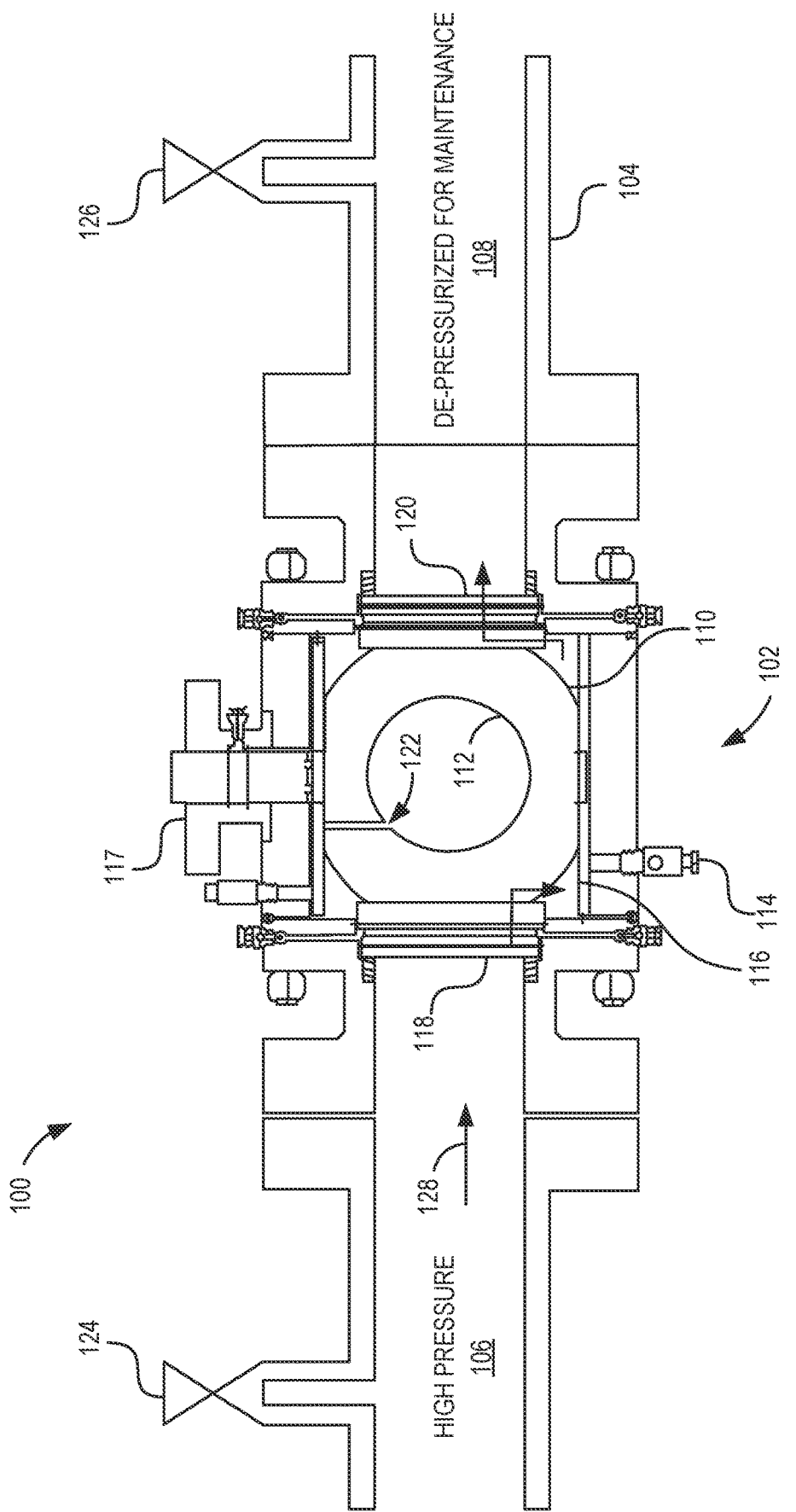
FIG. 1 illustrates an example double block-and-bleed valve implemented on an example pipe.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Pipelines are used to transport a fluid (e.g., natural gas, hydrogen, methane, other gas or liquid, etc.) between one or more locations. When maintenance is to be performed on a section of pipe, the section of pipe is isolated from the pipeline to temporarily prevent fluid from entering the section of pipe. In such cases, a valve implemented upstream of the section of pipe is closed to prevent the flow of fluid through the valve and into the section of pipe.

Typically, the valve is a double block-and-bleed valve including a rotatable ball with a cylindrical passageway. When the valve is open, fluid can pass through the ball via the cylindrical passageway, where the cylindrical passageway is substantially parallel to a direction of flow through the pipe. When the valve is closed, the ball is rotated 180 degrees so that the cylindrical passageway is substantially perpendicular to the direction of flow and fluid is prevented from flowing through the cylindrical passageway. Additionally, the valve is sealed at each end, where fluid at a high-pressure region is at a first end of the valve and a low-pressure region is at a second end of the valve.

Maintenance can be performed on the low-pressure region of the pipe while the valve is closed, where fluid is evacuated from the low-pressure region prior to one or more operators beginning work on the pipe. In some cases, unintentional leakage of fluid from the high-pressure region can occur, where the fluid escapes through one or both seals of the valve and enters the low-pressure region where maintenance is being performed. In some such cases, depending on the type of fluid in the pipe, the leaked fluid may pose a safety risk to the operators. In particular, when the fluid is a gas, accidental combustion and/or inhalation of the gas may occur. Typically, to prevent leakage of gas to the low-pressure region of pipe, a vent in the valve is opened to allow the gas entering the valve to be vented to the atmosphere. Although preventing the gas from entering the low-pressure region of pipe, venting can be harmful to the environment and may still pose a safety concern due to a risk of accidental combustion of the gas-air mixture proximate the valve.

In examples disclosed herein, an example valve evacuation system can be configured to remove the gas in the valve and return the gas to the high-pressure region of the pipe. In examples disclosed herein, one or more compressors pump the gas from the valve while the valve is closed and/or while maintenance is being performed on the low-pressure region of the pipe. The gas can be compressed by the example valve evacuation system, then stored and/or pumped back into the high-pressure region of the pipe. In examples disclosed herein, the gas is not vented to the atmosphere and is prevented from entering the low-pressure region of the pipe on which maintenance is being performed. Advantageously, examples disclosed herein can reduce the effects and/or risks of releasing the gas-air mixture into the atmosphere, and can further reduce exposure of operators to potentially-hazardous gases. Although the following systems and methods can apply to a variety of fluids, gas is used as an example in the following description.

FIG. 1 illustrates an example pipe system 100 including an example double block-and-bleed valve (e.g., valve) 102 implemented on an example pipe 104. In the illustrated example of FIG. 1, the valve 102 is implemented between an example high-pressure region 106 and an example low-pressure region 108 of the pipe 104. The example valve 102 further includes an example ball 110 with an example cylindrical passageway (e.g., passageway) 112, an example vent (e.g., body vent, drain valve, bleeder valve) 114 fluidly coupled to an example valve body 116, an example actuator 117 coupled to the ball 110, an example first seal 118, an example second seal 120, and an example hole 122 through the ball 110 to fluidly couple the cylindrical passageway 112 to the valve body 116. The pipe 104 further includes an upstream valve 124 fluidly coupled to the high-pressure region 106 and a downstream valve 126 fluidly coupled to the low-pressure region 108.

To open the valve 102, an operator turns the actuator 117 to rotate the ball 110 until the cylindrical passageway 112 is oriented substantially parallel to the pipe 104. When the valve 102 is open, gas flows from the high-pressure region 106 to the low-pressure region 108 via the cylindrical passageway 112 in an example direction of flow 128. Additionally, gas from the cylindrical passageway 112 can flow to the valve body 116 via the hole 122 to reduce a pressure of the gas inside the cylindrical passageway 112. In the illustrated example of FIG. 1, the valve 102 is closed. To close the valve 102, the operator further turns the actuator 117 to rotate the ball 110 until the cylindrical passageway 112 is oriented substantially perpendicular to the direction of flow 128. In such examples, the ball 110 engages the first seal 118 and the second seal 120 to prevent the gas from flowing though the valve 102.

In some examples, one or more operators can perform maintenance on the low-pressure region 108 of the pipe 104. For example, a section of the pipe 104 can be repaired and/or replaced in response to a defect (e.g., fracture, crack, etc.) being formed in the pipe 104. During maintenance, flow of gas into the low-pressure region 108 is prevented by closing the valve 102, and remaining gas in the low-pressure region 108 can be vented and/or evacuated (e.g., via the downstream valve 126). In response to closing the valve 102 and evacuating the gas from the low-pressure region 108, the operators can perform maintenance procedures on the pipe 104.

Typically, an interface between the ball 110 and the first seal 118 and/or between the ball 110 and the second seal 120 is not perfectly sealed. As such, gas from the high-pressure region 106 can escape through the first seal 118 into the valve body 116, and gas from the valve body 116 can further escape through the second seal 120 into the low-pressure region 108. In such examples, the gas entering the low-pressure region 108 can pose safety risks to the operators performing maintenance on the pipe 104. For example, the gas may be a flammable and/or combustible gas that can be unintentionally ignited during regular maintenance activities. Additionally or alternatively, the gas may be a hazardous substance that can pose health risks to the operators when inhaled.

To reduce the risks associated with gas entering the low-pressure region 108 during maintenance, gas in the valve body 116 is typically vented to the atmosphere by opening the body vent 114. The opened body vent 114 creates an alternate flow path for the gas entering the valve 102, so that the gas in the valve 102 vents to the atmosphere instead of escaping to the low-pressure region 108 via the second seal 120. Although opening the body vent 114 reduces some safety risks associated with the gas entering the low-pressure region 108, venting of the gas to the atmosphere can have harmful effects on the environment and poses a risk of accidental combustion of the gas proximate the valve.

Figure 2:
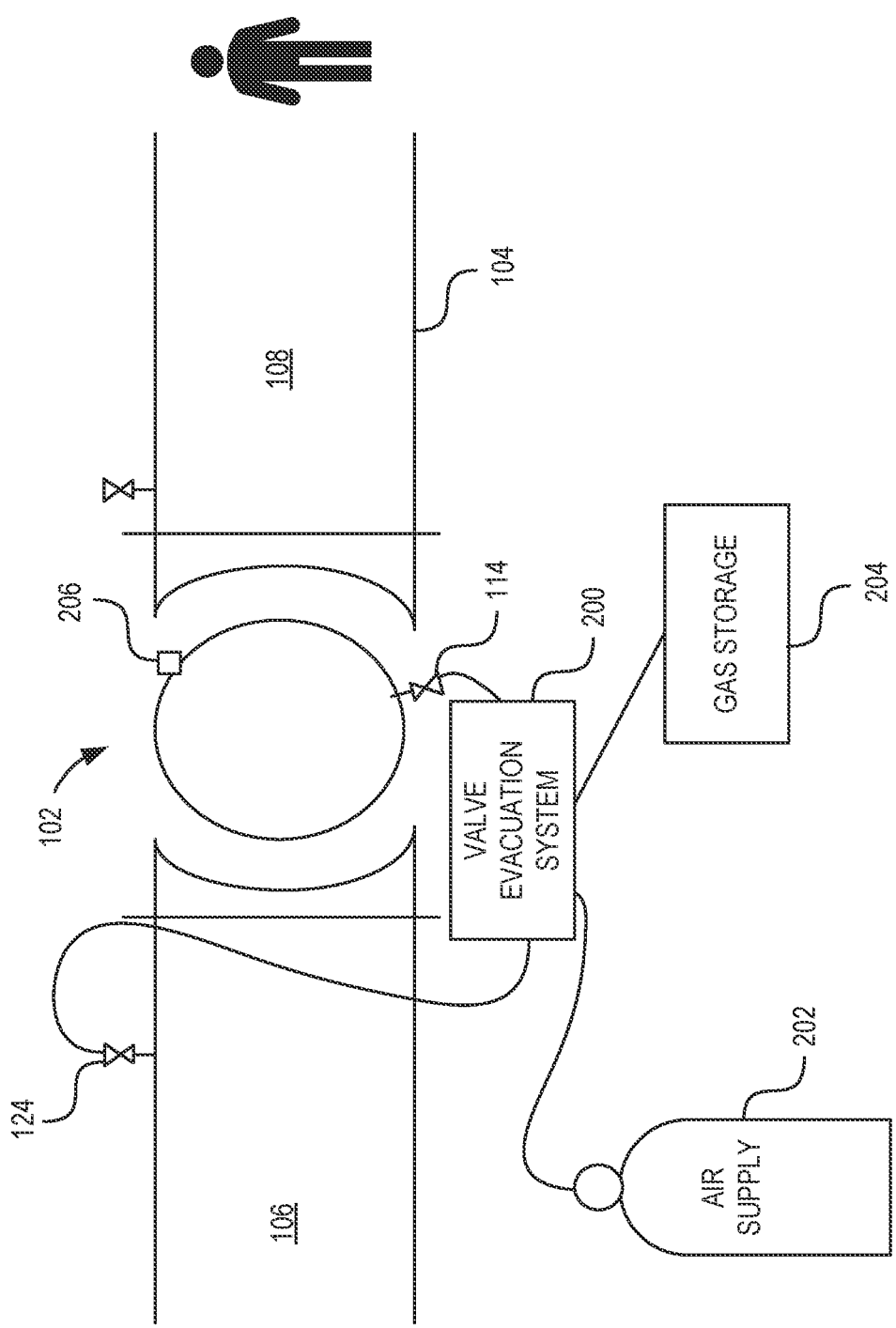
FIG. 2 illustrates an example valve evacuation system in accordance with teachings of this disclosure.

FIG. 2 illustrates an example valve evacuation system (e.g., fluid compression system) 200 used in connection with examples disclosed herein. In the illustrated example of FIG. 2, a generalized view of the example pipe system 100 of FIG. 1 is shown. For example, the valve evacuation system 200 is fluidly coupled between the body vent 114 of the valve 102 and the upstream valve 124 of FIG. 1. The valve evacuation system 200 is further coupled to an air supply (e.g., portable air supply) 202.

In the illustrated example of FIG. 2, one or more operators are to perform maintenance on the pipe 104 at the low-pressure region 108 downstream from the valve 102. Prior to performing maintenance, the operators close the valve 102 to prevent and/or limit a flow of gas from the high-pressure region 106. As described in connection with FIG. 1 above, a fraction of the gas from the high-pressure region 106 leaks into the valve 102. In the illustrated example of FIG. 2, instead of the operator opening the body vent 114 to vent the gas from the valve 102 to the atmosphere, the valve evacuation system 200 is turned on and begins to pump gas from the valve 102. In such examples, the valve evacuation system 200 compresses the gas, then pumps the compressed gas into the high-pressure region 106 via the upstream valve 124. As a result, the gas is prevented from flowing to the low-pressure region 108, thus reducing risk of accidental ignition and/or inhalation of the gas by the operators during maintenance. In such examples, the valve evacuation system 200 is configured to continuously pump gas from the valve 102 back into the high-pressure region 106 while maintenance is being performed by the operators. In response to completing maintenance on the pipe 104, the operators can turn off and/or remove the valve evacuation system 200, then open the valve 102 to resume gas service through the pipe 104. In some examples, an example sensor 206 is operatively coupled to the valve 102 to measure a position of the valve 102. In some examples, the valve evacuation system 200 is communicatively coupled to the sensor 206 to obtain measurement data therefrom, where the measurement data includes the measured position of the valve 102. In some such examples, the valve evacuation system 200 detects whether the valve 102 is in the open position or the closed position based on the measurement data. In some examples, the valve evacuation system 200 shuts off when determining that the valve 102 is in the open position, and/or turns on (e.g., compresses gas) when determining that the valve 102 is in the closed position.

In the illustrated example of FIG. 2, the air supply 202 contains compressed air to power one or more compressors of the valve evacuation system 200. In some examples, the air supply 202 contains nitrogen gas ($N_2$). In some examples, the air supply 202 can be a portable tank and/or nitrogen bottle that can be easily transported between locations of valves along the pipe 104.

In some examples, in response to compressing the gas from the valve 102, the valve evacuation system 200 can store the compressed gas in an example gas storage (e.g., storage unit) 204 in addition to or instead of pumping the compressed gas into the high-pressure region 106. In some such examples, the compressed gas in the gas storage 204 can be temporarily stored and later pumped into the high-pressure region 106 and/or into the low pressure region 108.

Figure 3A:
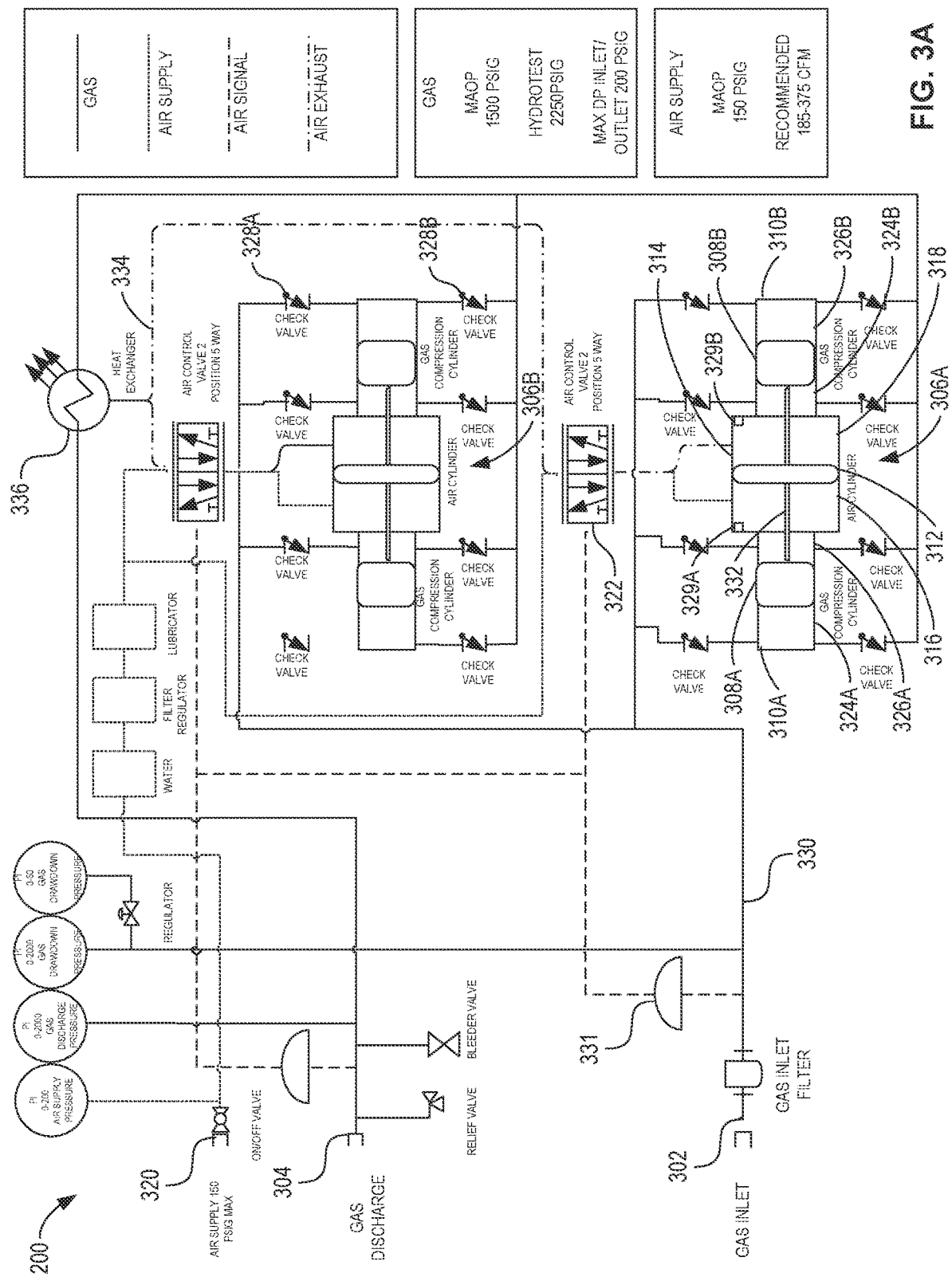
FIG. 3A is a schematic illustration of the example valve evacuation system of FIG. 2.

FIG. 3A is a schematic illustration of the example valve evacuation system 200 of FIG. 2. The example valve evacuation system 200 is configured to transport fluid (e.g., gas) from a first location (e.g., the valve 102 of FIGS. 1 and/or 2) to a second location (e.g., the high-pressure region 106 of FIGS. 1 and/or 2). The example valve evacuation system 200 includes an example fluid intake 302 coupled to the body vent 114 of the valve 102 and an example fluid discharge 304 coupled to the high-pressure region 106 of the pipe 104. Fluid is compressed by example compressor units 306A, 306B as the fluid flows from the fluid intake 302 to the fluid discharge 304. The compressor units 306A, 306B each include example compression pistons 308A, 308B implemented in example compression cylinders 310A, 310B, and an example air piston 312 implemented in an example air cylinder 314. The air cylinder 314 includes an example first chamber 316 and an example second chamber 318 coupled to an example air supply 202 via an example air control valve 322. The compression cylinders 310A, 310B include example third chambers 324A, 324B and example fourth chambers 326A, 326B coupled to the fluid intake 302 via inlet check valves 328A, and coupled to the fluid outlet via outlet check valves 328B.

In the illustrated example of FIG. 3A, fluid enters via the fluid intake 302 and flows to the compressor units 306A, 306B via example piping 330. The fluid enters the third chambers 324A, 324B and the fourth chambers 326A, 326B through the inlet check valves 328A. The inlet check valves 328A allow the fluid to flow unidirectionally from the fluid intake 302 to the compressor units 306A, 306B. The air control valve 322 also directs compressed air from the air supply 202 to enter the air cylinder 314. The air control valve 322 can alternate flow of the compressed air between the first chamber 316 and the second chamber 318. In the illustrated example of FIG. 3A, the air control valve 322 directs compressed air into the first chamber 316 in response to a first switch 329A being engaged, and directs compressed air into the second chamber 318 in response to a second switch 329B being engaged, where the first switch 329A and the second switch 329B are operatively coupled to the air control valve 322. In other examples, the air control valve 322 can switch a direction of flow of the compressed air based on a command and/or a signal from a computer and/or other processor communicatively coupled to the air control valve 322.

In the illustrated example of FIG. 3A, an under-pressure cutoff 331 is coupled to the piping 330 between the fluid intake 302 and the air control valve 322. In some examples, the under-pressure cutoff 331 can detect whether a pressure of the fluid in the piping 330 drops below a threshold pressure (e.g., cutoff pressure). In response to the under-pressure cutoff 331 determining that the pressure of the fluid has dropped below the cutoff pressure, the under-pressure cutoff 331 can send an air signal to the air control valve 322 to shut off the flow of compressed air into the compressor units 306A, 306B and, as such, prevent the compressor units 306A, 306B from further compressing the fluid. In examples disclosed herein, the under-pressure cutoff 331 is disabled (e.g., turned off) so that the compressor units 306A, 306B can continue to compress the fluid below the cutoff pressure.

In the illustrated example of FIG. 3A, in response to the air control valve 322 directing the compressed air to flow into the first chamber 316, the compressed air generates pressure on the air piston 312 to move the air piston 312 to the right (e.g., towards the second compression cylinder 310B). The air piston 312 is operatively coupled to the compression pistons 308A, 308B via an example rod 332, such that the compression pistons 308A, 308B move with the air piston 312. In response to the air piston 312 moving to the right and, thus, the compression pistons 308A, 308B moving to the right, the fluid in the fourth chambers 326A, 326B is compressed by the compression pistons 308A, 308B. Compressed fluid is expelled from the fourth chambers 326A, 326B and flows through the respective outlet check valves 328B towards the fluid discharge 304. The outlet check valves 328B allow the fluid to flow unidirectionally from the fluid intake 302 to the compressor units 306A, 306B.

In response to the air piston 312 being positioned to the right (in reference to the arrangement of FIG. 3A), the air piston 312 engages the second switch 329B coupled to the right side of the air cylinder 314. In response to the second switch 329B being engaged, the air control valve 322 stops the flow of compressed air to the first chamber 316 and directs the flow of compressed air to enter the second chamber 318. The compressed air from the first chamber 316 can be expelled to the atmosphere via air exhaust tubing 334. In some examples, the compressed air from the first chamber 316 can be used to cool the compressed fluid via an example heat exchanger 336 prior to the compressed air being expelled to the atmosphere.

In response to the air control valve 322 directed the flow of compressed air to enter the second chamber 318, the compressed air causes the air piston 312 and the compression pistons 308A, 308B to move to the left (e.g., toward the first compression cylinder 310A). The fluid in the third chambers 324A, 324B is compressed by the compression pistons 308A, 308B. The compressed fluid is expelled from the third chambers 324A, 324B and flows through the respective outlet check valves 328B towards the fluid discharge 304.

In response to the air piston 312 being positioned to the left (in reference to the arrangement of FIG. 3A), the air piston 312 engages the first switch 329A coupled to the left side of the air cylinder 314. In response to the first switch 329A being engaged, the air control valve 322 stops the flow of compressed air to the second chamber 318 and once again directs the flow of compressed air to enter the first chamber 316. In the illustrated example of FIG. 3A, the air control valve 322 continuously redirects the flow of compressed air between the first chamber 316 and the second chamber 318 to compress fluid entering the third chambers 324A, 324B and the fourth chambers 326A, 326B.

In the illustrated example of FIG. 3A, the valve evacuation system 200 includes two compressor units (e.g., the first compressor unit 306A and the second compressor unit 306B). In other examples, to reduce a size of the valve evacuation system 200, only one of the compressor units is used. In other examples, multiple ones (e.g., three or more) of the compressor units are used. In such examples, the rate of compression and/or the differential pressure of the gas compressed by the valve evacuation system 200 can be modified by selectively configuring an arrangement of the compressor units (e.g., in a series arrangement and/or in a parallel arrangement).

Figure 3B:
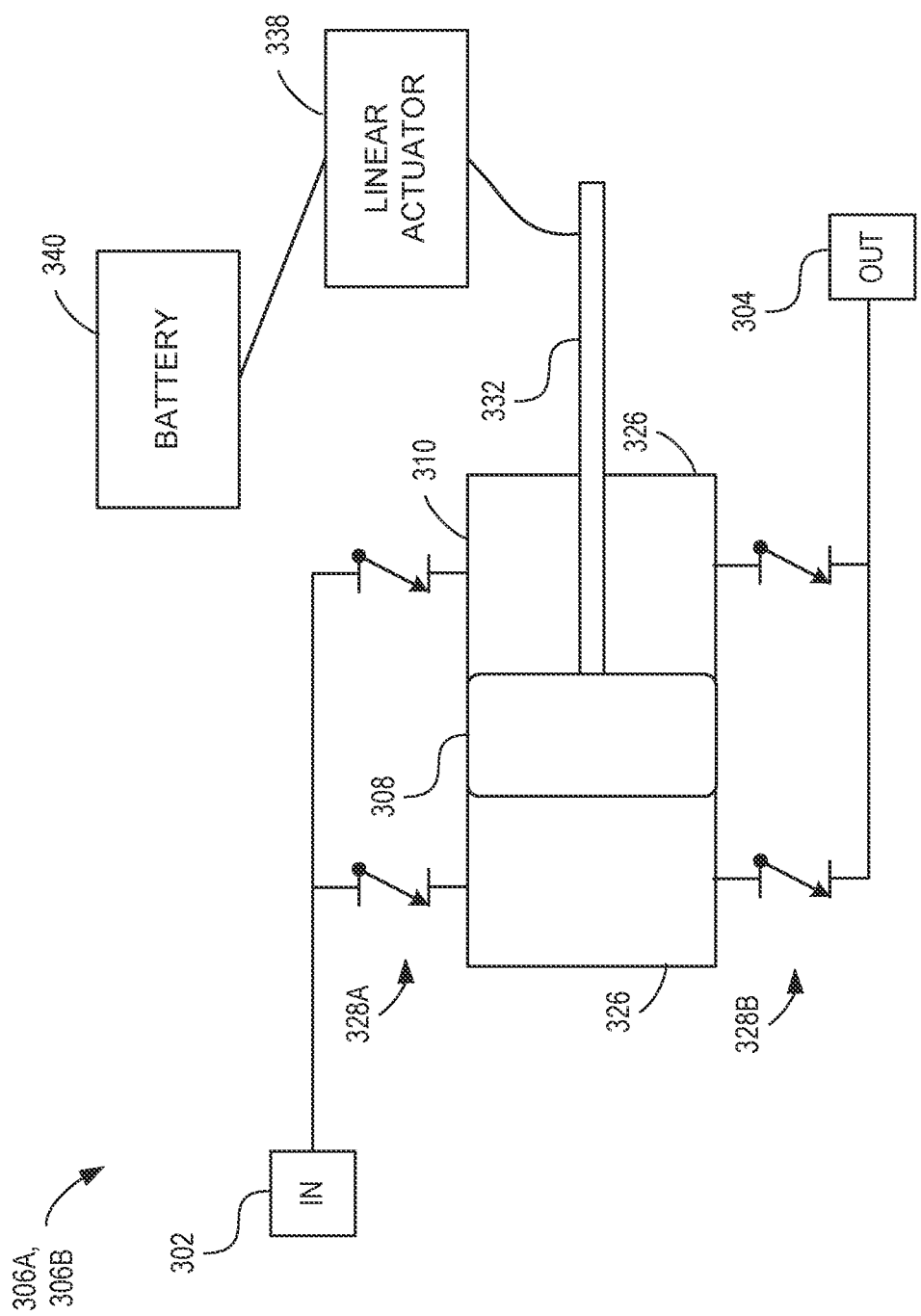
FIG. 3B illustrates example compressor units of FIG. 3A configured for electrical actuation.

FIG. 3B illustrates the compressor units 306A, 306B of FIG. 3A configured for electrical, rather than pneumatic, actuation. In such examples, gas from the fluid intake 302 of FIG. 3A is not compressed using compressed air from the air supply 202, but rather is compressed via an example linear actuator 338. As such, in this example, the valve evacuation system 200 does not include the air control valve 322, the air supply 202, and/or the air exhaust tubing 334 of FIG. 3A. The linear actuator 338 is coupled to and/or powered by an example battery 340.

In the illustrated example of FIG. 3B, the linear actuator 338 is operatively coupled to the rod 332 to move the gas piston 308 (e.g., the first gas piston 308A or the second gas piston 308B of FIG. 3A) inside the compression cylinder 310 (e.g., the first compression cylinder 310A or the second compression cylinder 310B of FIG. 3A). In this example, the linear actuator 338 is configured such that the gas piston 308 moves to the left when the linear actuator 338 extends, and the gas piston 308 moves to the right when the linear actuator 338 contracts. Alternatively, in other examples, the linear actuator 338 is configured such that the gas piston 308 moves to the left when the linear actuator 338 contracts, and the gas piston 308 moves to the right when the linear actuator 338 extends.

In this example, each of the compressor units 306A, 306B includes a single one of the gas pistons 308A, 308B and a corresponding one of the compression cylinders 310A, 310B. In such examples, each of the compressor units 306A, 306B includes corresponding ones of the linear actuator 338. In other examples, the linear actuator 338 can be coupled to both of the compressor units 306A, 306B to operate the compressor units 306A, 306B simultaneously. In other examples, the compressor units 306A, 306B can include both of the gas pistons 308A, 308B operated by the linear actuator 338.

In the illustrated example of FIG. 3B, in response to the linear actuator 338 moving the gas piston 308 to the right, the gas in the fourth chamber 326 is compressed by the gas piston 308. Compressed gas is expelled from the fourth chamber 326 and flows through the respective outlet check valves 328B towards the fluid discharge 304. Alternatively, in response to the linear actuator 338 moving the gas piston 308 to the left, the gas in the third chamber 324 is compressed by the gas piston 308. Compressed gas is expelled from the fourth chamber 326 and flows through the respective outlet check valves 328B towards the fluid discharge 304. In this example, the linear actuator 338 continuously moves between an extended position and a contracted position to compress gas entering the third chamber 324 and the fourth chamber 326 until the gas is evacuated from the first location (e.g., coupled to the fluid intake 302) and transferred to the second location (e.g., coupled to the fluid discharge 304).

Figure 3C:
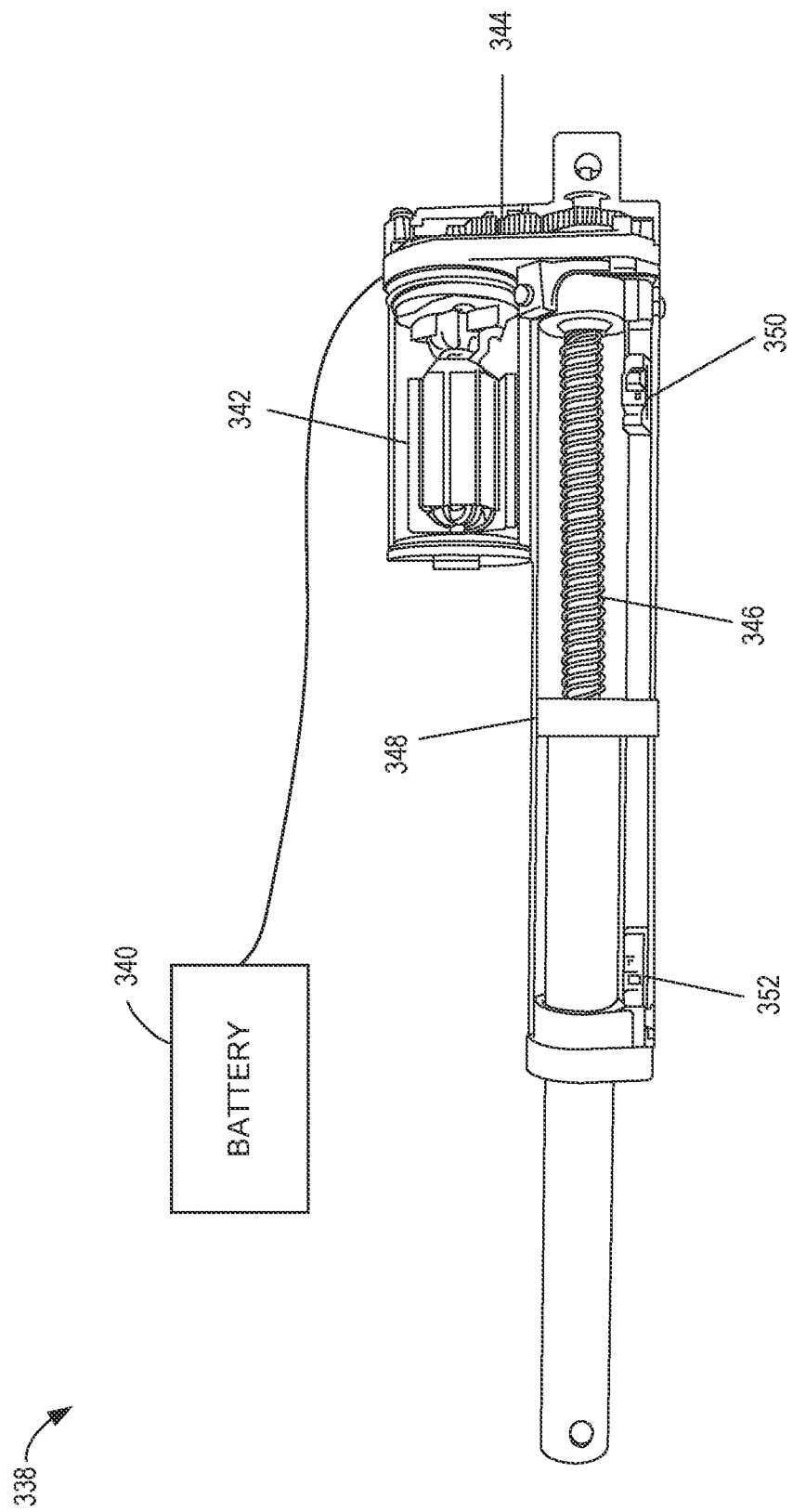
FIG. 3C illustrates a perspective view of the example linear actuator of FIG. 3B.

FIG. 3C illustrates a perspective view of the example linear actuator 338 of FIG. 3B. The example linear actuator 338 includes an example motor 342 coupled to the battery 340 of FIG. 3B, an example gear box 344, an example lead screw 346, an example drill nut 348, an example retract limit switch 350, and an example extend limit switch 352. In the illustrated example of FIG. 3C, rotation of the motor 342 causes corresponding rotation of the lead screw 346 via the gear box 344. The rotation of the lead screw 346 causes linear travel of the drill nut 348 along the lead screw 346 and, as such, causes the linear actuator 338 to extend or retract based on a direction of rotation of the motor 342 and/or the lead screw 346. For example, the linear actuator 338 extends in response to the motor 342 rotating in a first direction, and the linear actuator 338 retracts in response to the motor 342 rotating in a second direction, where the second direction is opposite from the first direction.

In the illustrated example of FIG. 3C, in response to the linear actuator 338 being fully extended, the drill nut 348 engages the extend limit switch 352. In such examples, the extend limit switch 352 sends a first electrical signal to the motor 342. In some examples, the first electrical signal causes the motor 342 to stop rotating and/or reverse the direction of rotation (e.g., from the first direction to the second direction). Alternatively, in response to the linear actuator 338 being fully retracted, the drill nut 348 engages the retract limit switch 350. In such examples, the retract limit switch 350 sends a second electrical signal to the motor 342. In some examples, where the first electrical signal causes the motor 342 to stop rotating and/or reverse the direction of rotation (e.g., from the second direction to the first direction). As such, repeatedly engaging the retract limit switch 350 and the extend limit switch 352 causes linear reciprocal travel of the linear actuator 338 to compress the gas in the compression cylinder 310 of FIG. 3B.

Figure 4:
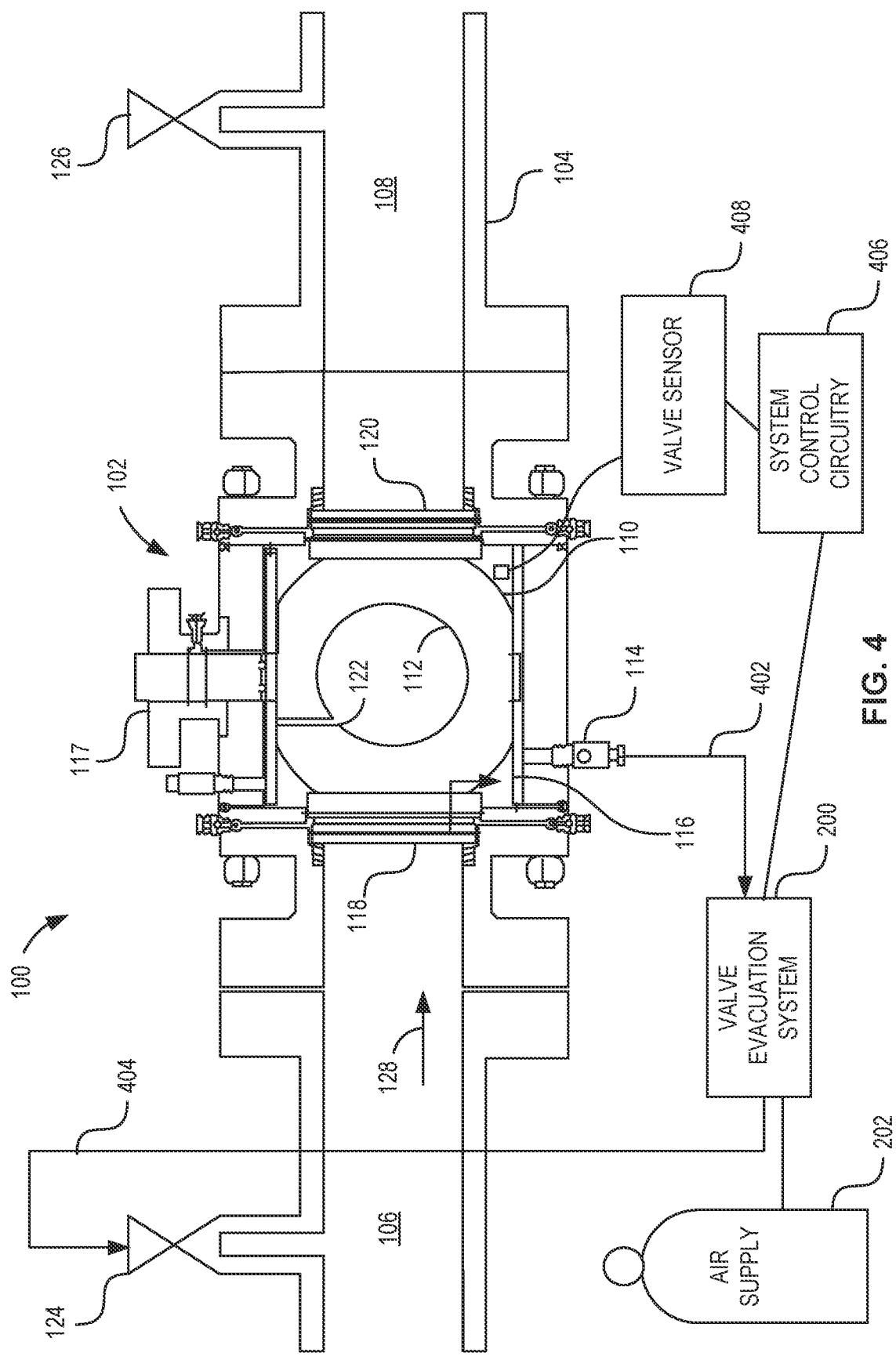
FIG. 4 illustrates the example valve evacuation system of FIGS. 2 and/or 3A and example system control circuitry implemented on the double block-and-bleed valve of FIG. 1.

FIG. 4 illustrates the example valve evacuation system 200 of FIGS. 2 and/or 3A implemented on the double block-and-bleed valve 102 of FIG. 1. The valve evacuation system 200 is fluidly coupled to the body vent 114 via example inlet piping 402, and is fluidly coupled to the upstream valve 124 via example outlet piping 404, where the valve evacuation system 200 is configured to pump gas from the valve body 116 to the high-pressure region 106. In the illustrated example of FIG. 4, the valve 102 is closed (e.g., the ball 110 is rotated so that the cylindrical passage 112 is oriented substantially perpendicular to the direction of flow 128). As such, the ball 110 engages both the first seal 118 and the second seal 120 to prevent and/or limit the flow of gas through the valve 102.

In the illustrated example of FIG. 4, one or more operators are to perform maintenance on the low-pressure region 108 of the pipe 104. In response to closing the valve 102 via the actuator 117, the operators evacuate and/or vent the gas from the low-pressure region 108 via the downstream valve 126. For example, the operators can vent the gas to the atmosphere and/or flare the gas via the downstream valve 126 until the low-pressure region 108 is fully evacuated (e.g., no gas is present). In some examples, the valve evacuation system 200 can also be configured to evacuate the gas from the low-pressure region 108 via the downstream valve 126 and pump the gas into the high-pressure region 106 via the upstream valve 124 instead of venting the gas to the atmosphere.

In response to the low-pressure region 108 being fully evacuated, the operators can turn on the valve evacuation system 200 to begin pumping gas from the valve 102. For example, compressed air and/or nitrogen gas from the air supply 202 is continuously redirected between the first chamber 316 and the second chamber 318 of the compressor units 306A, 306B of the valve evacuation system 200. In such examples, the compressed air causes reciprocating motion of the air piston 312 to compress gas entering the compression cylinders 310A, 310B via the inlet piping 402. In some examples, the gas includes gas leaked to the valve body 116 from the high-pressure region 106 and/or gas from the cylindrical passageway 112 that flows to the valve body 116 via the hole 122. In response to compressing the gas, the valve evacuation system 200 pumps the compressed gas to the high-pressure region 106 via the outlet piping 404. Advantageously, gas is prevented from leaking to the low-pressure region 108 via the first seal 118 and/or the second seal 120. As such, maintenance can be performed on the low-pressure region 108 of the pipe 104 with a reduced risk of combustion and/or inhalation of leaked gas.

While the operators are performing maintenance on the low-pressure region 108, the valve 102 remains closed and the valve evacuation system 200 continuously pumps gas from the valve 102. In response to completing maintenance, the operators can shut off the valve evacuation system 200, then open the valve 102 to resume flow of the gas through the pipe 104. In some examples, the valve evacuation system 200 can be removed from the body vent 114 and the upstream valve 124, where the body vent 114 and the upstream valve 124 are sealed and/or otherwise closed in response to removal of the valve evacuation system 200. In some examples, the valve evacuation system 200 can be transported to another valve and/or section of the pipe 104 to perform maintenance on a different section of the pipe 104.

In the illustrated example of FIG. 4, example system control circuitry 406 is coupled to the valve evacuation system 200 for controlling operation thereof. In some examples, the system control circuitry 406 controls operation of the valve evacuation system 200 based on measurement data from an example valve sensor 408 coupled to the valve 102. In some examples, the valve sensor 408 measures a position (e.g., a rotational position) of the valve 102, and the system control circuitry 406 determines whether the valve 102 is open or closed based on the measured position. In some examples, the system control circuitry 406 switches on the valve evacuation system 200 to evacuate fluid from the valve 102 when the valve 102 is closed, and the system control circuitry 406 shuts off the valve evacuation system 200 to stop evacuation of fluid from the valve 102 when the valve 102 is open.

In examples disclosed herein, the valve 102 implements means for controlling flow, the vent 114 implements means for venting, the fluid evacuation system 200 implements means for evacuating, the high-pressure region 106 implements means for containing, the valve sensor 408 implements means for measuring, the compressor units 306A, 306B, 306C, 306D implement means for compressing, the air supply 202 implements means for supplying air, and the gas storage 204 implements means for storing.

Figure 5:
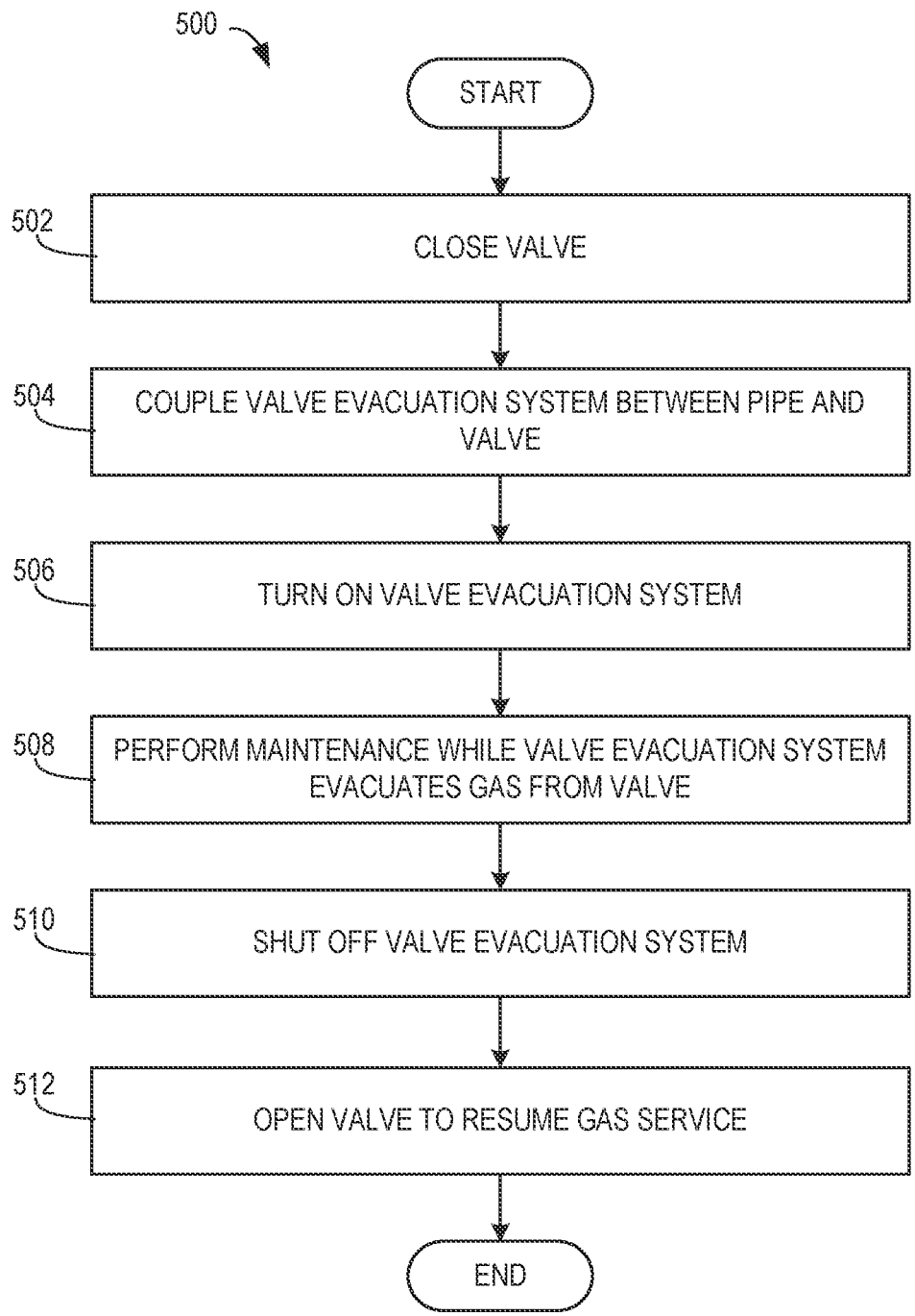
FIG. 5 is a flowchart representative of instructions which may be executed to implement the example valve evacuation system as described in connection with FIGS. 2, 3A, and/or 4.

FIG. 5 is a flowchart representative of instructions 500 which may be executed to implement the example valve evacuation system 200 in a maintenance procedure as described in connection with FIGS. 2, 3A, and/or 4. The instructions 500 begin as the valve 102 is open and gas is flowing through the pipe 104.

At block 502, the valve 102 is closed. For example, an operator manually closes the valve 102 by rotating the actuator 117 until the cylindrical passageway 112 of the ball 110 is oriented substantially perpendicular to the direction of flow 128. In such examples, the gas is prevented and/or partially prevented from entering and/or exiting the valve 102 via the first seal 118 and/or the second seal 120. In some examples, the valve 102 can be electrically controlled (e.g., opened or closed) via a command signal sent from a computer system, controller, and/or other processor coupled to the valve 102.

At block 504, the valve evacuation system 200 is coupled between the pipe 104 and the valve 102. For example, the valve evacuation system 200 is coupled to the body vent 114 so that gas from the valve 102 can flow to the valve evacuation system 200 via the inlet piping 402. Further, the example valve evacuation system 200 is coupled to the upstream valve 124 so that gas from the valve evacuation system 200 can flow to the high-pressure region 106 of the pipe 104 via the outlet piping 404.

At block 506, the valve evacuation system 200 is turned on. For example, the operator turns on the valve evacuation system 200 to begin compressing and/or otherwise evacuating gas from the valve 102, then pumping the compressed gas into the high-pressure region 106 via the outlet piping 404. In such examples, the air supply 202 supplies compressed air to the valve evacuation system 200 to power the one or more compressor units 306A, 306B to compress the gas. In some examples, in addition to or instead of pumping the gas to the high-pressure region 106, the valve evacuation system 200 stores the compressed gas (e.g., in the gas storage 204 of FIG. 2).

At block 508, the operators perform maintenance on the low-pressure region 108 of the pipe 104 while the valve evacuation system 200 evacuates gas from the valve 102. In such examples, the valve evacuation system 200 redirects gas leaking into the valve 102 to the high-pressure region 106, thus preventing the leaked gas from entering the low-pressure region 108 via the second seal 120. As such, the operators can perform maintenance with a reduced risk of accidental combustion and/or inhalation of the leaked gas.

At block 510, the valve evacuation system 200 is shut off in response to the operators completing maintenance on the low-pressure region 108 of the pipe 104. For example, the operators shut off the valve evacuation system 200 to prevent the valve evacuation system 200 from further evacuating gas from the valve 102. In some examples, the valve evacuation system 200 is removed from the body vent 114 and/or the from the upstream valve 124 upon completion of maintenance. In some such examples, the valve evacuation system 200 can be transported to and/or implemented on a different valve of the pipe 104 to perform maintenance on a different section of the pipe 104.

At block 512, the valve 102 is opened to resume gas service in the pipe 104. For example, an operator manually opens the valve 102 by rotating the actuator 117 until the cylindrical passageway 112 of the ball 110 is oriented substantially parallel to the direction of flow 128. In such examples, the gas can flow through the cylindrical passageway 112 from the high-pressure region 106 to the low-pressure region 108 of the pipe 104. Then the process ends.

Figure 6:
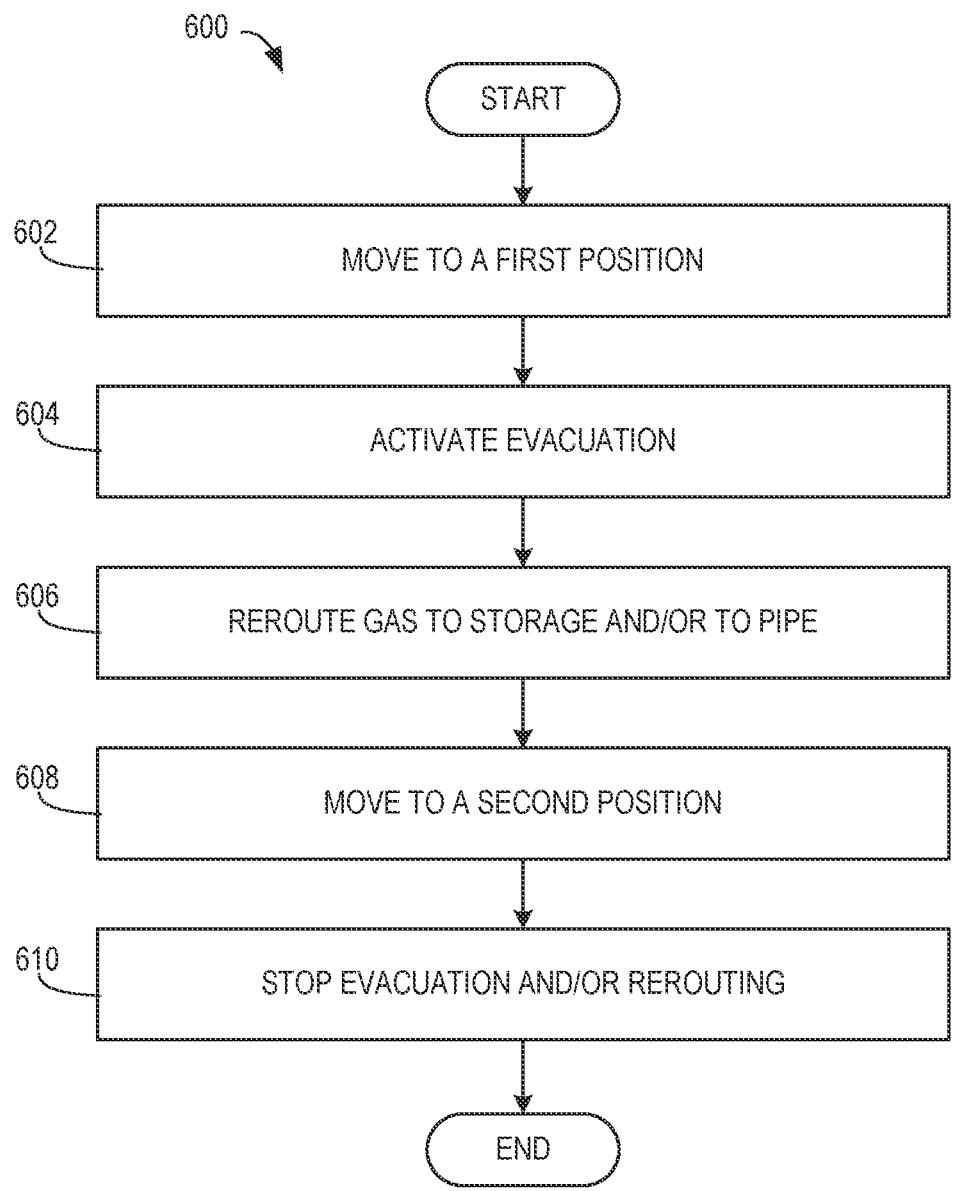
FIG. 6 is a flowchart representative of operations executed by the valve of FIGS. 1, 2, and/or 4 and/or by the valve evacuation system of FIGS. 2, 3A, and/or 4 during maintenance of a pipe.

FIG. 6 is a flowchart representative of operations executed by the valve 102 of FIGS. 1, 2, and/or 4 and/or by the valve evacuation system 200 of FIGS. 2, 3A, and/or 4 during maintenance of the pipe 104. An example process 600 of FIG. 6 begins as maintenance is to be performed on the pipe 104.

At block 602, the valve 102 moves to a first position (e.g., closed position). For example, the ball 110 of the valve 102 rotates so that the cylindrical passageway 112 is substantially perpendicular to the direction of flow 128 of FIGS. 1 and/or 4. In such examples, the valve 102 prevents gas from flowing between the high-pressure region 106 and the low-pressure region 108 of the pipe 104.

At block 604, evacuation of the valve 102 by the valve evacuation system 200 is activated. For example, the valve evacuation system 200 pumps gas from the valve 102 via the inlet piping 402 of FIG. 4, and compresses the gas via the compressor units 306A, 306B of FIG. 3A. In such examples, gas leaked to the valve 102 is prevented from further leaking to the low-pressure region 108 via the second seal 120. In some examples, the valve evacuation system 200 is activated in response to the valve evacuation system 200 detecting (e.g., via a sensor) that the valve 102 has been closed.

At block 606, in response to compressing the gas, the valve evacuation system 200 reroutes the compressed gas to the gas storage 204 of FIG. 2 and/or to the high-pressure region 106 of the pipe 104. In some such examples, the compressed gas flows from the valve evacuation system 200 to the upstream valve 124 via the outlet piping 404 of FIG. 4.

At block 608, the valve 102 moves to a second position (e.g., open position). For example, the ball 110 of the valve 102 rotates so that the cylindrical passageway 112 is substantially parallel to the direction of flow 128. In such examples, gas can flow through the valve 102 from the high-pressure region 106 to the low-pressure region 108 of the pipe 104.

At block 610, the valve evacuation system 200 stops evacuation and/or rerouting of the gas. For example, the valve evacuation system 200 ceases compression of the gas from the valve 102, and further ceases rerouting the compressed gas to the pipe 104 and/or to the gas storage 204. In some examples, evacuation and/or rerouting of the gas is stopped in response to the valve evacuation system 200 detecting (e.g., via the sensor 206 of FIG. 2) that the valve 102 has been opened. Then the process ends.

Figure 7:
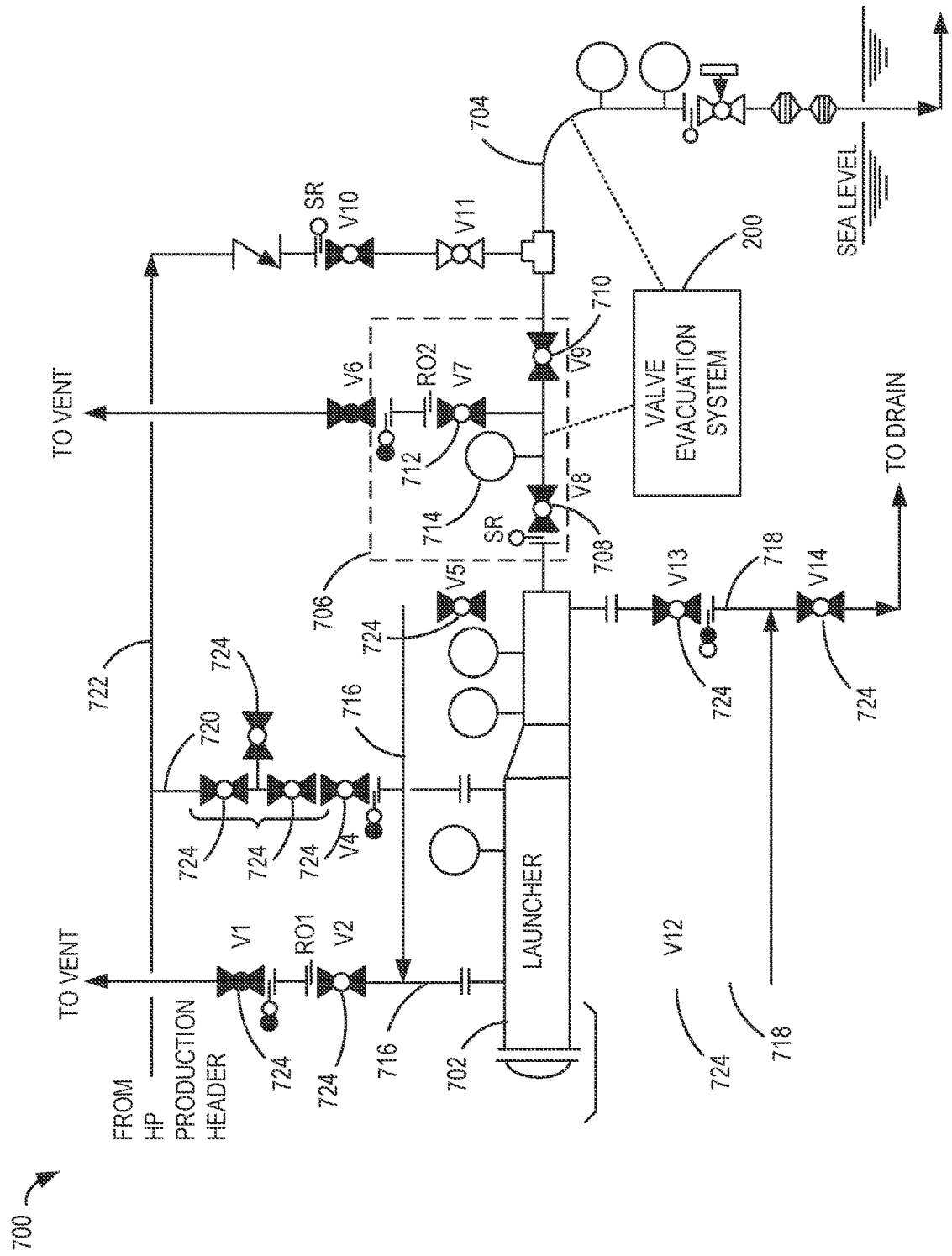
FIG. 7 illustrates an example pig launcher and receiver system on which the example valve evacuation system of FIGS. 2, 3A, and/or 4 may be implemented.

FIG. 7 illustrates an example pig launcher and receiver system 700 on which the example valve evacuation system 200 may be implemented. In some examples, the pig launcher and receiver system 700 enables the launching and receiving of a pipeline inspection gauge (e.g., a pig) through a pipeline system to perform maintenance and/or cleaning thereof. In the illustrated example of FIG. 7, the pig launcher and receiver system 700 includes an example pig launcher (e.g., a launcher) 702 fluidly coupled to an example pipeline 704. A first example double block-and-bleed system 706 is implemented on the pipeline 704 downstream of the pig launcher 702. The first double block-and-bleed system 706 includes first and second block valves (e.g., ball valves) 708, 710 and an example bleed valve (e.g., a vent) 712 fluidly coupled therebetween. In this example, an example pressure gauge 714 is operatively coupled to the pipeline 704 between the first and second block valves 708, 710.

In the illustrated example of FIG. 7, example vent lines 716 are coupled to the pig launcher 702 to vent gas therefrom when a pig is to be inserted or removed, and example drain lines 718 are coupled to the pig launcher 702 for draining liquid therefrom. Furthermore, an example kicker line 720 is coupled to the pig launcher 702 to provide gas thereto from an example high-pressure line 722 of the pipeline 704. In some examples, when a pig is to be launched into the pipeline 704, pressurized gas enters the pig launcher 702 via the kicker line 720, and the pressurized gas propels and/or otherwise launches the pig forward in the pig launcher 702 toward the pipeline 704. In this example, control valves 724 are implemented on the vent lines 716, the drain lines 718, and the kicker line 720 to control flow of fluid therethrough.

In some examples, when a pig is to be launched and/or received in the pig launcher 702, gas is vented and/or otherwise evacuated from the pig launcher 702 prior to opening. In some examples, during launching and/or receiving of the pig, the first and second block valves 708, 710 are closed and the bleed valve 712 is opened, such that the first double block-and-bleed system 706 enables the pig launcher 702 to be depressurized and isolated from the pipeline 704. However, in some such examples, leakage of gas may occur through at least one of the first block valve 708 or the second block valve 710, and the gas can pose safety risks to the operators performing the launching and/or receiving.

In the illustrated example of FIG. 7, the valve evacuation system 200 is fluidly coupled to the pipeline 704 between the first and second block valves 708, 710 to evacuate and compress gas therefrom. In this example, the valve evacuation system 200 is further fluidly coupled to a downstream portion of the pipeline 704 downstream of the first double block-and-bleed system 706. In this example, the valve evacuation system 200 provides the evacuated and/or compressed gas from the double block-and-bleed system 706 to the downstream portion of the pipeline 704. As such, the valve evacuation system 200 prevents leakage of gas to the pig launcher 702 and reduces venting of gas to the atmosphere via the bleed valve 712. In other examples, in addition to or instead of providing compressed gas to the downstream portion of the pipeline 704, the valve evacuation system 200 provides the compressed gas to the high-pressure line 722 and/or stores the compressed gas in the gas storage 204 of FIG. 2.

Figure 8:
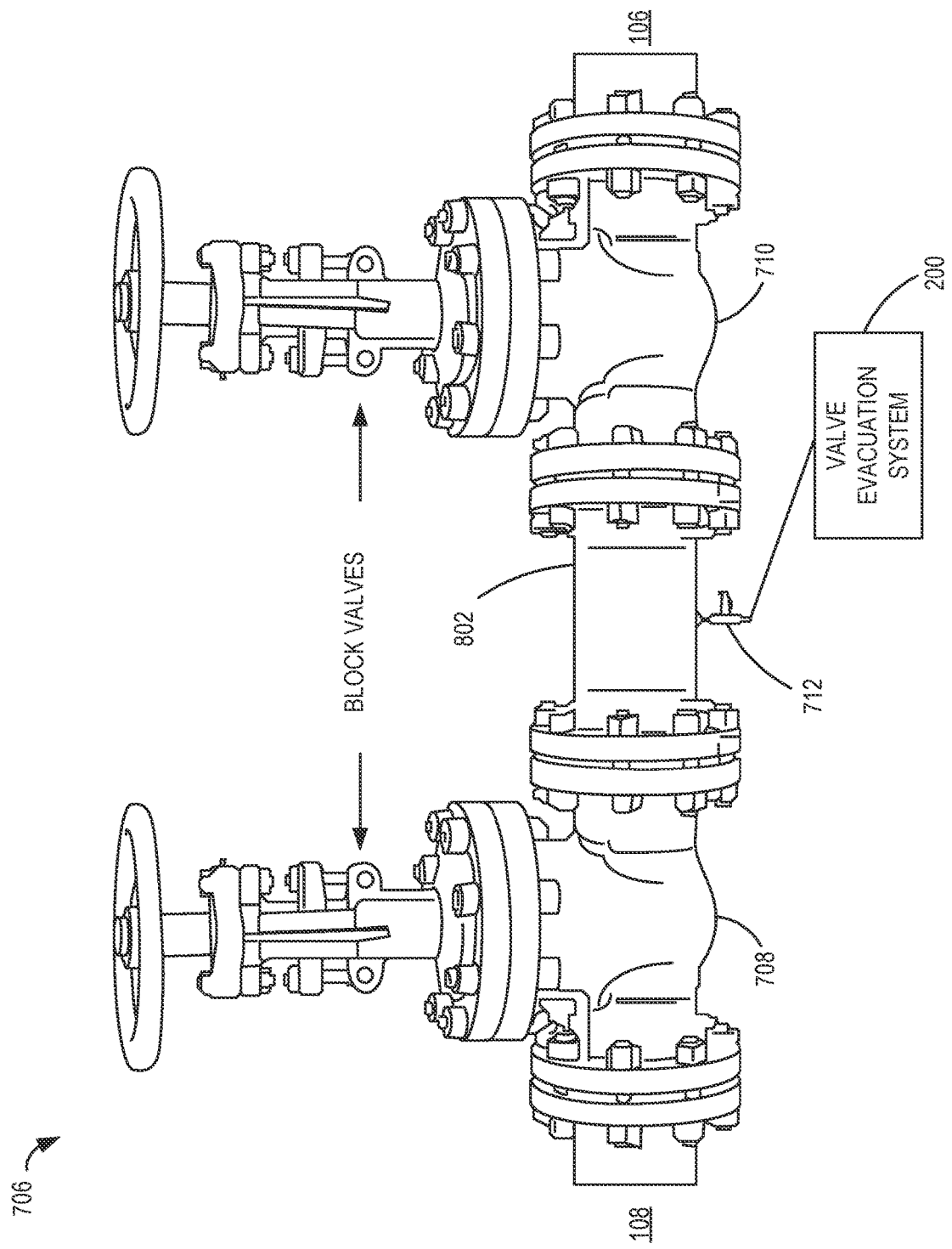
FIG. 8 illustrates the first example double block-and-bleed system of FIG. 7.

FIG. 8 illustrates the example first double block-and-bleed system 706 of FIG. 7. In the illustrated example of FIG. 8, an example pipe section 802 is fluidly coupled between the first and second block valves 708, 710. In some examples, the pipe section 802 is isolated from the high-pressure region 106 and low-pressure region 108 of the pipeline 704 by manually rotating the first and second block valves 708, 710 to a closed position, thereby preventing and/or otherwise restricting flow of fluid therebetween. While in some examples the valve evacuation system 200 can be coupled to a valve (e.g., the double block-and-bleed valve 102 of FIG. 2) to evacuate gas therefrom, the valve evacuation system 200 can additionally or alternatively evacuate gas from the pipe section 802 via the bleed valve 712.

Figure 9:
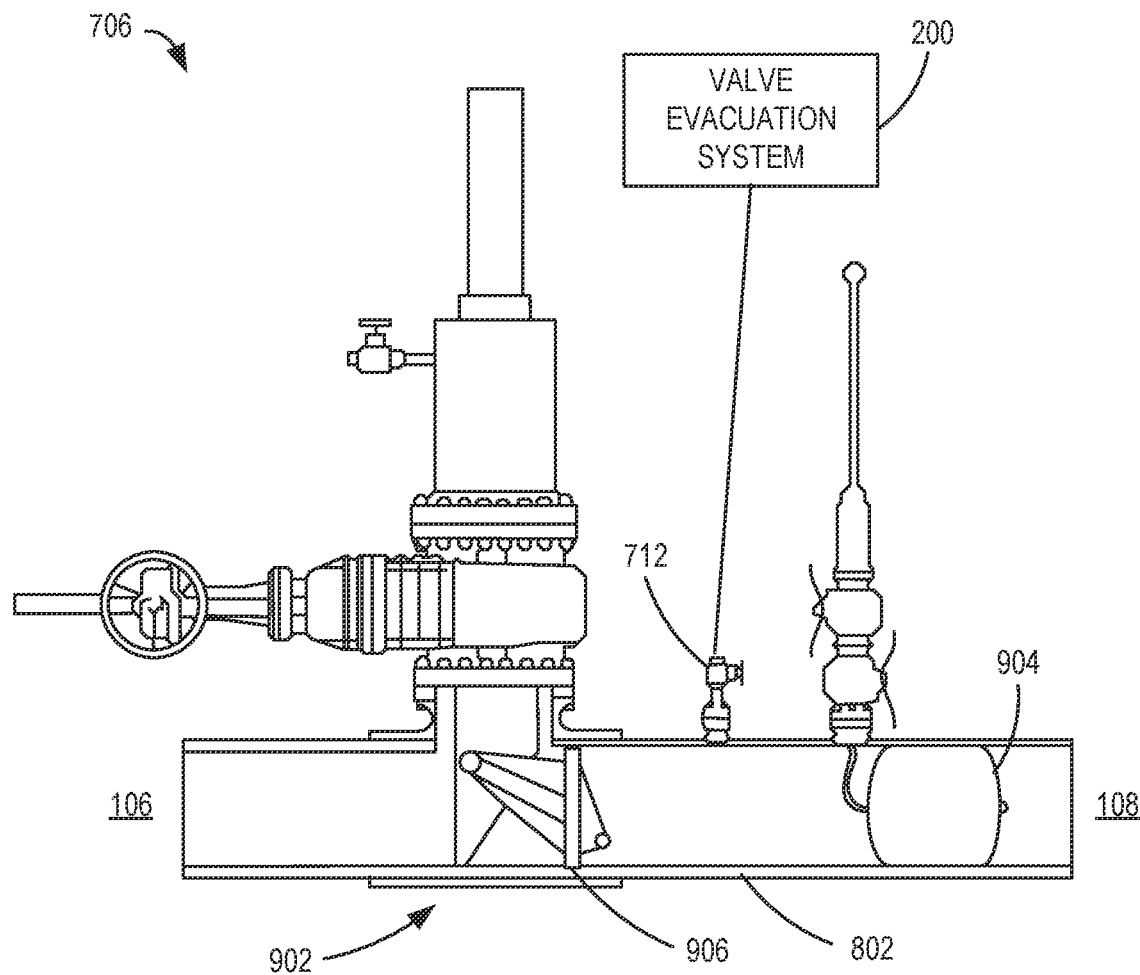
FIG. 9 illustrates a second example double block-and-bleed system.

FIG. 9 illustrates a second example double block-and-bleed system 900. In the illustrated example, the pipe section 802 is isolated from the high-pressure region 106 and the low-pressure region 108 using an example valve 902 and an example plug (e.g., bladder, inflatable plug) 904 (e.g., instead of the first and second block valves 708, 710 of FIG. 7). When the valve 902 is in the closed position as shown in the illustrated example of FIG. 9, an example valve seal 906 of the valve 902 engages an inner surface of the pipe section 802 to prevent and/or restrict flow of fluid from the high-pressure region 106 to the pipe section 802. Furthermore, the plug 904 is inflated to engage the inner surface of the pipe section 802, such that the plug 904 prevents and/or restricts flow of fluid between the pipe section 802 and the low-pressure region 108. In other examples, a different type of valve and/or a different type of plug may be used instead to isolate the pipe section 802 from the high-pressure region 106 and/or the low-pressure region 108.

In the illustrated example of FIG. 9, the bleed valve 712 is fluidly coupled to the pipe section 802 and the valve evacuation system 200 is coupled to the bleed valve 712. In some examples, when the valve 902 is closed and the plug 904 is inflated, the valve evacuation system 200 can evacuate and compress gas from the pipe section 802 to prevent and/or otherwise reduce leakage of the gas to the low-pressure region 108. In some examples, the valve evacuation system 200 returns the compressed gas to the high-pressure region 106, and/or stores the compressed gas in the gas storage 204 of FIG. 2. As such, the valve evacuation system 200 enables maintenance to be performed downstream of the pipe section 802 with reduced risk of leakage of the gas. Furthermore, in some examples, implementation of the valve evacuation system 200 reduces and/or otherwise eliminates a need for venting of the gas to the atmosphere via the bleed valve 712, thus reducing adverse environmental impacts caused by venting.

Figure 10:
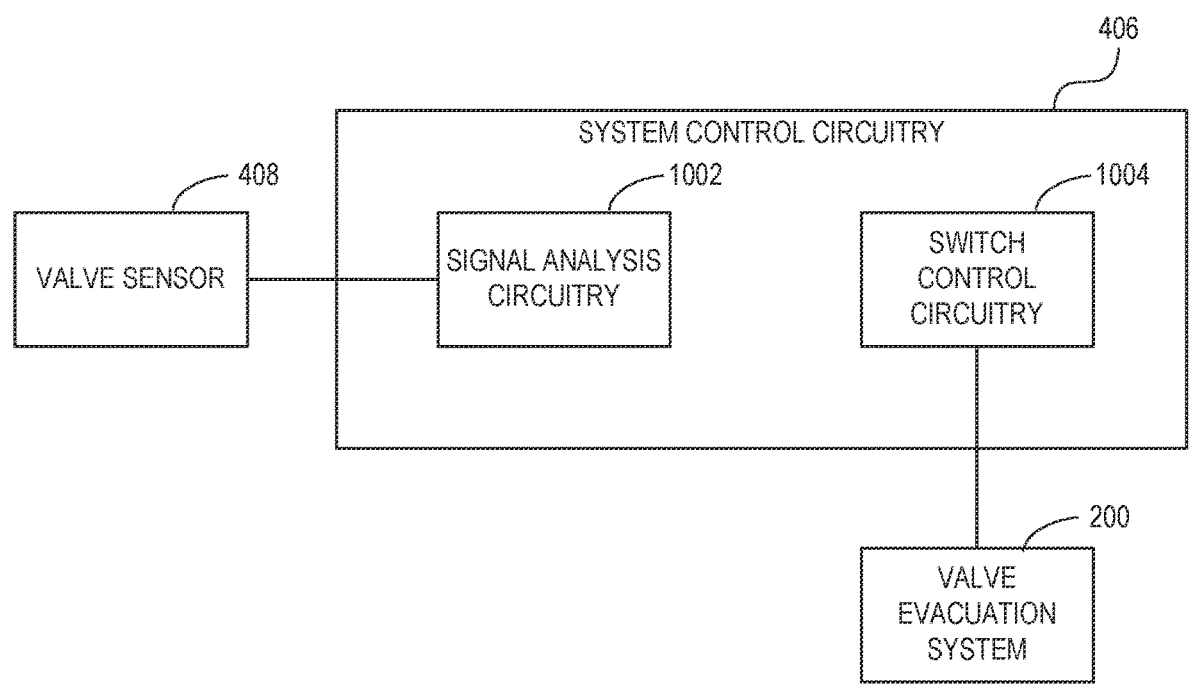
FIG. 10 is a block diagram of the example system control circuitry of FIG. 4.

FIG. 10 is a block diagram of the example system control circuitry 406 of FIG. 4. In some examples, the system control circuitry 406 can be used to operate (e.g., switch on and/or shut off) the valve evacuation system 200 without intervention by an operator. In the illustrated example of FIG. 10, the system control circuitry 406 includes example signal analysis circuitry 1002 communicatively coupled to the valve sensor 408, and example switch control circuitry 1004 operatively coupled to the valve evacuation system 200.

The signal analysis circuitry 1002 obtains and/or receives a position (e.g., a rotational position) of the valve 102 of FIG. 4 from the valve sensor 408. In some examples, the signal analysis circuitry 1002 determines whether the valve 102 is open or closed based on the measured position.

In some examples, the system control circuitry 406 includes means for analyzing. For example, the means for analyzing may be implemented by the signal analysis circuitry 1002. In some examples, the signal analysis circuitry 1002 may be implemented by machine executable instructions such as that implemented by at least blocks 1102, 1104, 1110 of FIG. 11 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the signal analysis circuitry 1002 is implemented by other hardware logic circuitry, hardware implemented state machines, and/or any other combination of hardware, software, and/or firmware. For example, the signal analysis circuitry 1002 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The switch control circuitry 1004 switches on and/or shuts off the valve evacuation system 200 to cause and/or prevent evacuation of fluid from the valve 102. In some examples, the switch control circuitry 1004 switches the valve evacuation system 200 on or off based on the measured position of the valve 102. For example, in response to the signal analysis circuitry 1002 determining that the valve 102 is closed, the switch control circuitry 1004 switches on the valve evacuation system 200 to cause evacuation of fluid from the valve 102. In some examples, in response to the signal analysis circuitry 1002 determining that the valve 102 is open, the switch control circuitry 1004 shuts off the valve evacuation system 200 to stop and/or otherwise prevent evacuation of fluid from the valve 102.

In some examples, the system control circuitry 406 includes means for switching. For example, the means for switching may be implemented by the switch control circuitry 1004. In some examples, the switch control circuitry 1004 may be implemented by machine executable instructions such as that implemented by at least blocks 1106, 1108, 1110 of FIG. 11 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the switch control circuitry 1004 is implemented by other hardware logic circuitry, hardware implemented state machines, and/or any other combination of hardware, software, and/or firmware. For example, the switch control circuitry 1004 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the system control circuitry 406 of FIG. 4 is illustrated in FIG. 10, one or more of the elements, processes, and/or devices illustrated in FIG. 10 may be combined, divided, re-arranged, omitted, eliminated, and/or implemented in any other way. Further, the example signal analysis circuitry 1002, the example switch control circuitry 1004, and/or, more generally, the example system control circuitry 406 of FIG. 4, may be implemented by hardware, software, firmware, and/or any combination of hardware, software, and/or firmware. Thus, for example, any of the example signal analysis circuitry 1002, the example switch control circuitry 1004, and/or, more generally, the example system control circuitry 406, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example signal analysis circuitry 1002 and/or the example switch control circuitry 1004 is/are hereby expressly defined to include a non-transitory computer readable storage device or storage disk such as a memory, a digital versatile disk (DVD), a compact disk (CD), a Blu-ray disk, etc., including the software and/or firmware. Further still, the example system control circuitry 406 of FIG. 4 may include one or more elements, processes, and/or devices in addition to, or instead of, those illustrated in FIG. 10, and/or may include more than one of any or all of the illustrated elements, processes and devices.

Figure 11:
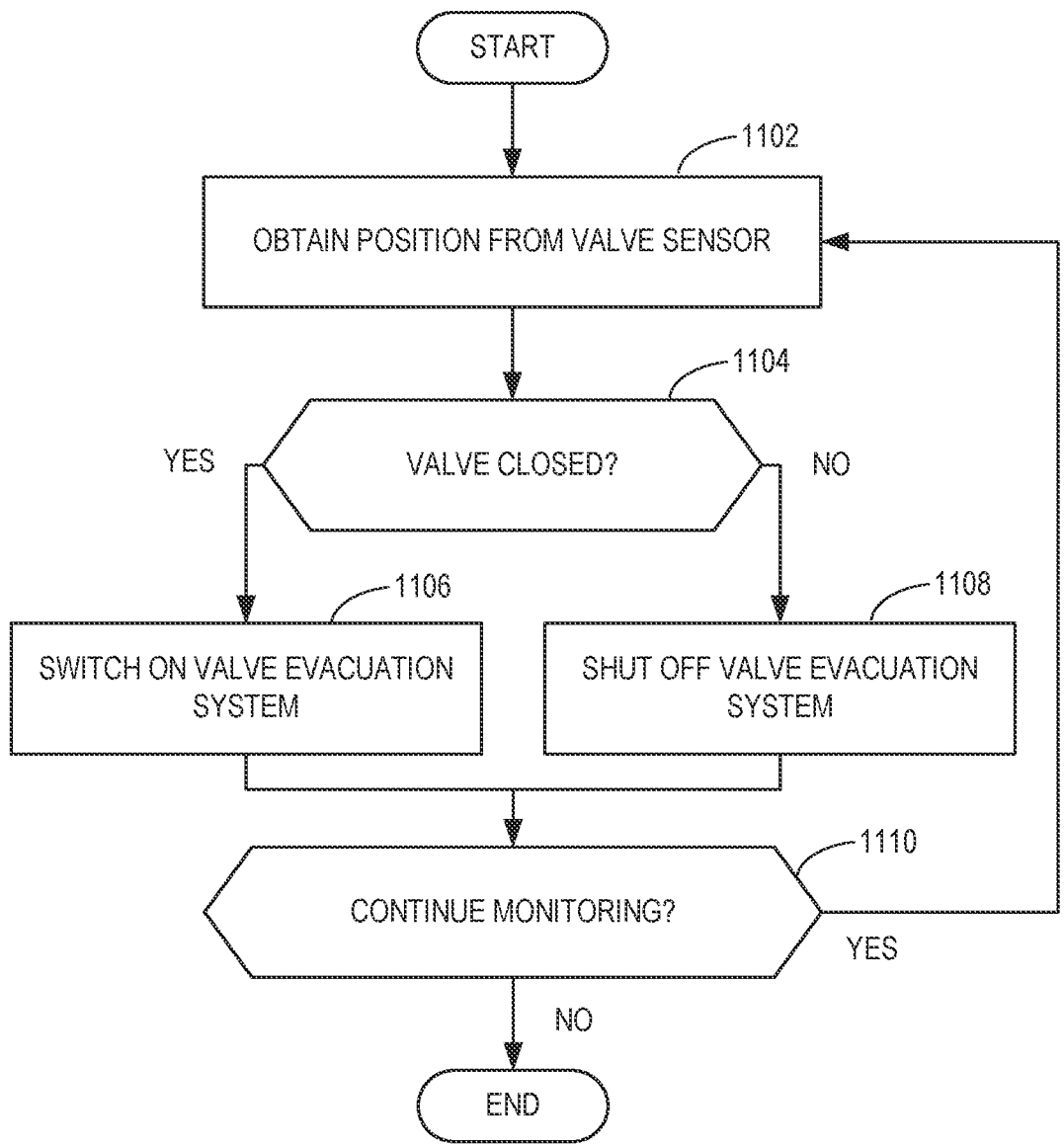
FIG. 11 is a flowchart representative of example machine readable instructions that may be executed by example processor circuitry to implement the example system control circuitry of FIG. 10.

A flowchart representative of example hardware logic circuitry, machine readable instructions, hardware implemented state machines, and/or any combination thereof for implementing the system control circuitry 406 of FIG. 10 is shown in FIG. 11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 12, many other methods of implementing the example system control circuitry 406 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed and/or instantiated by the example system control circuitry 406 of FIGS. 4 and/or 10 to control evacuation of fluid from the valve 102 of FIG. 4. The machine readable instructions and/or operations 1100 of FIG. 11 begin at block 1102, at which the example system control circuitry 406 obtains a position of the valve 102 from the valve sensor 408 of FIGS. 4 and/or 10. For example, the example signal analysis circuitry 1002 of FIG. 10 obtains the position (e.g., rotational position) of the valve 102 measured by the valve sensor 408. In some examples, the signal analysis circuitry 1002 determines whether the valve 102 is open or closed based on the measured position.

At block 1104, the example system control circuitry 406 determines whether the valve 102 is closed. For example, in response to the signal analysis circuitry 1002 determining that the valve 102 is closed (e.g., block 1104 returns a result of YES), control proceeds to block 1106. Alternatively, in response to the signal analysis circuitry 1002 determining that the valve 102 is open (e.g., block 1104 returns a result of NO), control proceeds to block 1108.

At block 1106, the example system control circuitry 406 switches on the valve evacuation system 200. For example, the example switch control circuitry 1004 of FIG. 10 switches on the valve evacuation system 200 to enable evacuation of fluid from the valve 102.

At block 1108, the example system control circuitry 406 shuts off the valve evacuation system 200. For example, the switch control circuitry 1004 switches on the valve evacuation system 200 to stop and/or otherwise prevent evacuation of fluid from the valve 102.

At block 1110, the example system control circuitry 406 determines whether to continue monitoring. In some examples, the switch control circuitry 1004 determines not to continue monitoring when the switch control circuitry 1004 is disconnected from the valve evacuation system 200 and/or the valve evacuation system 200 is removed from the valve 102. In response to the switch control circuitry 1004 determining to continue monitoring (e.g., block 1110 returns a result of YES), control returns to block 1102. Alternatively, in response to the switch control circuitry 1004 determining not to continue monitoring (e.g., block 1110 returns a result of NO), the process ends.

Figure 12:
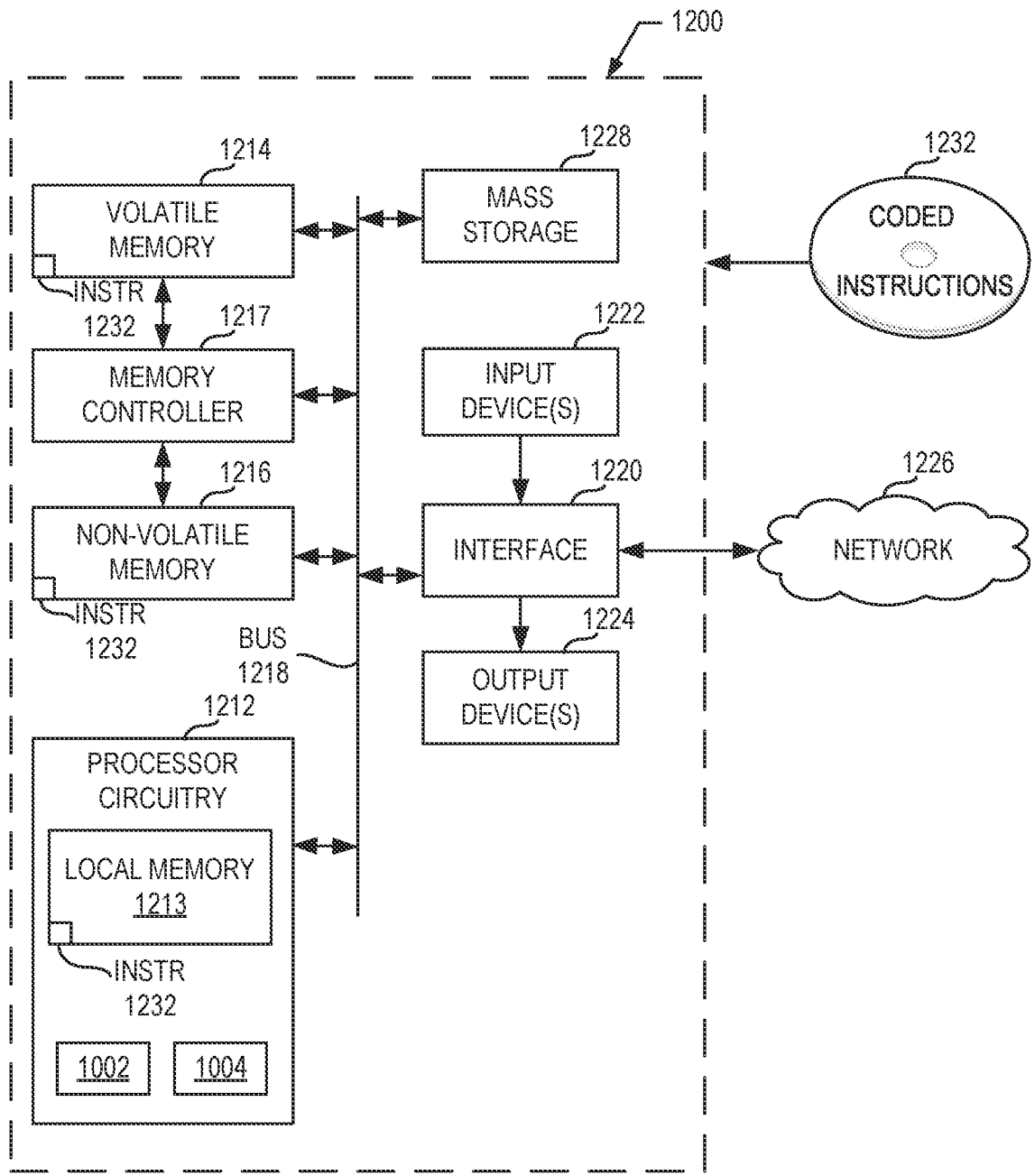
FIG. 12 is a block diagram of an example processing platform including processor circuitry structured to execute the example machine readable instructions of FIG. 11 to implement the example system control circuitry of FIG. 10.

FIG. 12 is a block diagram of an example processor platform 1200 structured to execute and/or instantiate the machine readable instructions and/or operations of FIG. 11 to implement the system control circuitry 406 of FIG. 10. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example signal analysis circuitry 1002 and the example switch control circuitry 1004.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIG. 11, may be stored in the mass storage device 1228, in the volatile memory 1214, in the non-volatile memory 1216, and/or on a removable non-transitory computer readable storage medium such as a CD or DVD.

Figure 13:
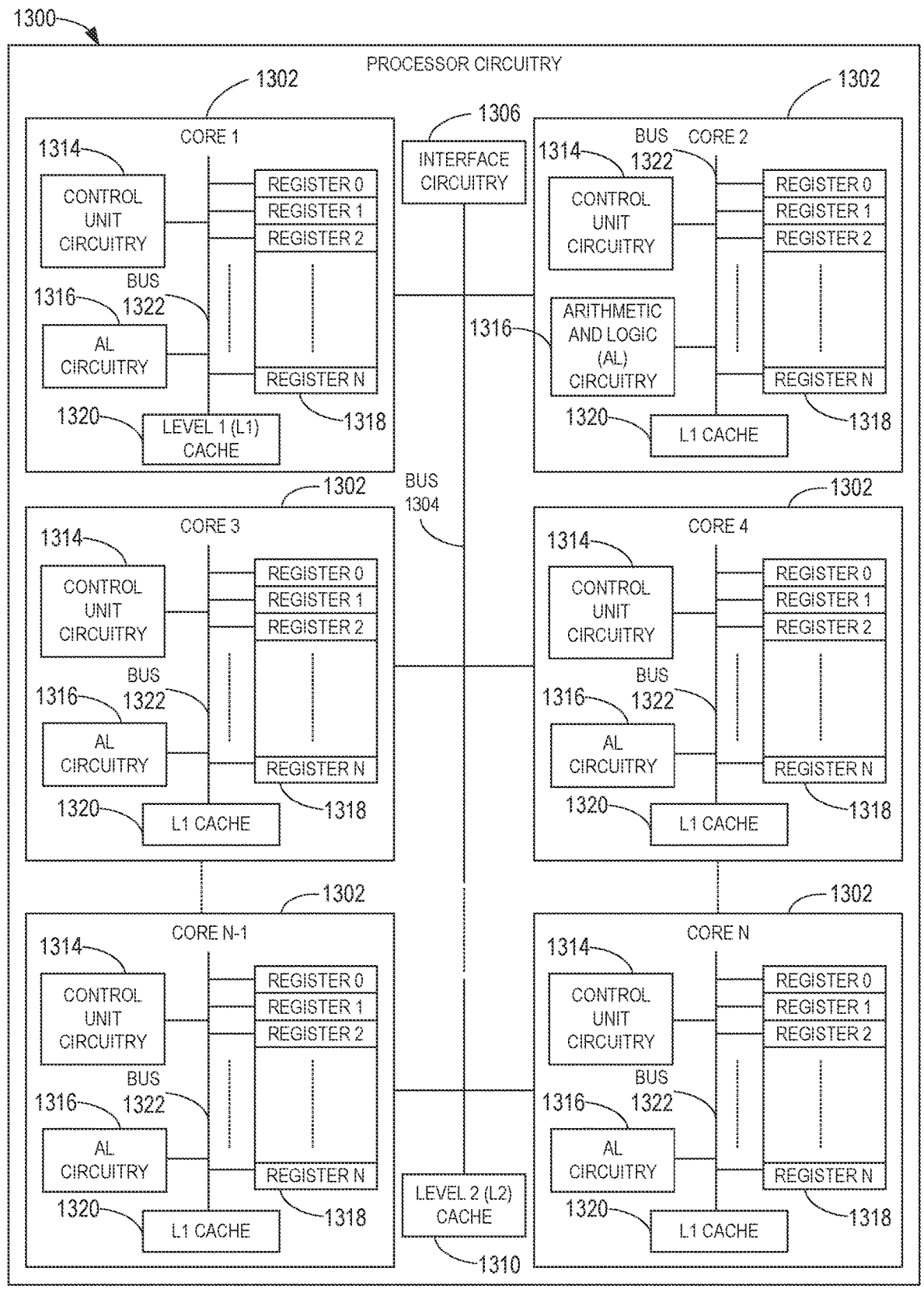
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowchart of FIG. 11.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13.

Alternatively, the registers 1318 may be organized in any other arrangement, format, or structure including distributed throughout the core 1302 to shorten access time. The bus 1320 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
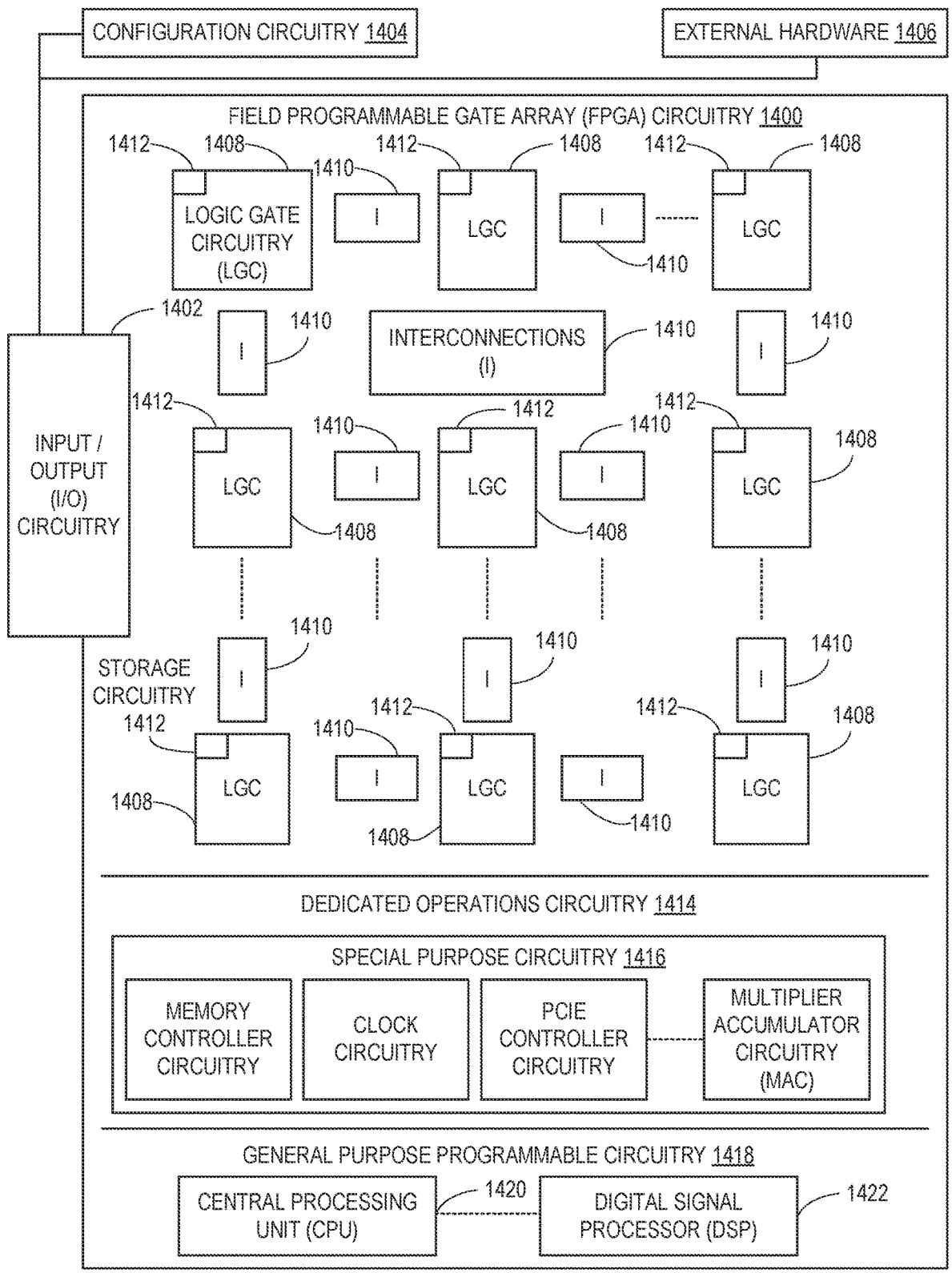
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowchart of FIG. 11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowchart of FIG. 11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIG. 11. As such, the FPGA circuitry 1400 may be structured to effectively instantiate some or all of the machine readable instructions of the flowchart of FIG. 11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIG. 11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowchart of FIG. 11 may be executed by one or more of the cores 1302 of FIG. 13 and a second portion of the machine readable instructions represented by the flowchart of FIG. 11 may be executed by the FPGA circuitry 1400 of FIG. 14.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that evacuate gas from a valve and/or from a section of pipe to prevent leakage of the gas to a low-pressure region of the pipe. The disclosed methods, apparatus and articles of manufacture improve the safety of maintenance procedures for a gas pipeline by reducing an amount of gas vented to the atmosphere and/or leaked to a low-pressure region of pipe, thus reducing cost of the gas and/or reducing risk of accidental combustion and/or inhalation of the gas during maintenance. Configuration and movement of the valve and associated evacuation system components can occur manually and/or using one or more sensors, actuators, processors, and/or other mechanical, electrical, and/or electromechanical elements to facilitate configuration, movement, change in mode, and other operation of the methods, apparatus, and articles of manufacture disclosed and described herein.

Valve evacuation apparatus, control, and associated methods are disclosed herein. Further examples and combinations thereof include the following:

Example 1 includes an apparatus to evacuate fluid from a first location, the apparatus including a vent fluidly coupled to the first location, and a valve evacuation system fluidly coupled between the vent and a second location, the valve evacuation system to compress the fluid from the first location and pump the compressed fluid to the second location.

Example 2 includes the apparatus of example 1, wherein the first location is a cylindrical passageway of a double block-and-bleed valve.

Example 3 includes the apparatus of example 1, wherein the first location is a pipe section between a first valve and a second valve, the first and second valves in a closed position.

Example 4 includes the apparatus of example 1, wherein the first location is a pipe section between a valve and an inflatable plug.

Example 5 includes the apparatus of example 1, wherein the second location is a storage unit coupled to the valve evacuation system.

Example 6 includes the apparatus of example 1, wherein the second location is a high-pressure region upstream of the first location.

Example 7 includes the apparatus of example 1, wherein the valve evacuation system includes one or more compressors to compress the fluid, the one or more compressors selectively configured between a series arrangement and a parallel arrangement.

Example 8 includes the apparatus of example 7, further including a portable air supply coupled to the valve evacuation system, the portable air supply to power the one or more compressors.

Example 9 includes an apparatus to evacuate fluid from a pipe section, the apparatus comprising a vent fluidly coupled to the pipe section, the pipe section coupled between a first valve and a second valve, and a valve evacuation system fluidly coupled between the vent and a high-pressure line of a pig launcher and receiver system, the valve evacuation system to compress the fluid from the pipe section and pump the compressed fluid to the high-pressure line.

Example 10 includes the apparatus of example 9, wherein the valve evacuation system includes one or more compressors to compress the fluid, the one or more compressors selectively configured between a series arrangement and a parallel arrangement.

Example 11 includes the apparatus of example 10, further including a portable air supply coupled to the valve evacuation system, the portable air supply to power the one or more compressors.

Example 12 includes the apparatus of example 9, wherein the pipe section is proximate a launcher of the pig launcher and receiver system.

Example 13 includes the apparatus of example 9, wherein the valve evacuation system compresses the fluid when the first and second valves are in a closed position.

Example 14 includes an apparatus to evacuate fluid from a valve, the apparatus comprising a vent fluidly coupled to the valve, and a valve evacuation system fluidly coupled between the vent and a high-pressure region upstream of the valve, the valve evacuation system to compress the fluid from the valve and pump the compressed fluid to the high-pressure region.

Example 15 includes the apparatus of example 14, wherein the valve is operable between an open position and a closed position, the valve evacuation system to compress the fluid from the valve when the valve is in the closed position.

Example 16 includes the apparatus of example 15, wherein the valve evacuation system determines whether the valve is in the closed position or the open position based on measurement data from a sensor coupled to the valve.

Example 17 includes the apparatus of example 14, wherein the valve evacuation system includes one or more compressors to compress the fluid, the one or more compressors selectively configured between a series arrangement and a parallel arrangement.

Example 18 includes the apparatus of example 17, further including a portable air supply coupled to the valve evacuation system, the portable air supply to power the one or more compressors.

Example 19 includes the apparatus of example 14, further including a storage unit coupled to the valve evacuation system, the valve evacuation system to store the compressed fluid in the storage unit prior to pumping the compressed fluid to the high-pressure region.

Example 20 includes the apparatus of example 14, where the fluid is from a cylindrical passageway of a ball of the valve.

Example 21 includes a method to evacuate fluid from a valve, the method comprising fluidly coupling a valve evacuation system between the valve and a high-pressure region upstream of the valve, compressing, via the valve evacuation system, fluid from the valve, and pumping, via the valve evacuation system, the compressed fluid to the high-pressure region.

Example 22 includes the method of example 21, further including moving the valve from an open position to a closed position prior to compressing the fluid from the valve.

Example 23 includes the method of example 22, further including determining whether the valve is in the closed position based on measurement data from a sensor coupled to the valve.

Example 24 includes the method of example 21, further including selectively configuring one or more compressors of the valve evacuation system between a series arrangement and a parallel arrangement.

Example 25 includes the method of example 24, further including powering the one or more compressors via a portable air supply coupled to the valve evacuation system.

Example 26 includes the method of example 21, further including storing, prior to pumping the compressed fluid to the high-pressure region, the compressed fluid in a storage unit coupled to the valve evacuation system.

Example 27 includes the method of example 21, further including compressing the fluid from a cylindrical passageway of a ball of the valve.

Example 28 includes a non-transitory computer readable medium comprising instructions that, when executed, cause processor circuitry to at least in response to determining that a valve is closed, switch on a valve evacuation system coupled between the valve and a high-pressure region upstream of the valve, the valve evacuation to compress fluid from the valve and pump the compressed fluid to the high-pressure region, and in response to determining that the valve is open, shut off the valve evacuation system to stop compression of the fluid from the valve.

Example 29 includes the non-transitory computer readable medium of example 28, wherein the instructions, when executed, cause the processor circuitry to at least obtain measurement data from a sensor coupled to the valve.

Example 30 includes the non-transitory computer readable medium of example 29 includes wherein the instructions, when executed, cause the processor circuitry to determine whether the valve is open or closed based on the measurement data.

Example 31 includes an apparatus comprising means for venting fluidly coupled to means for controlling flow, and means for evacuating fluidly coupled between the means for venting and means for containing, the means for containing upstream of the means for controlling flow, the means for evacuating to compress fluid from the means for controlling flow and pump the compressed fluid to the means for containing.

Example 32 includes the apparatus of example 31, wherein the means for controlling flow is operable between an open position and a closed position, the means for evacuating to compress the fluid from the means for controlling flow when the means for controlling flow is in the closed position.

Example 33 includes the apparatus of example 32, wherein the means for evacuating determines whether the means for controlling flow is in the closed position or the open position based on measurement data from a means for measuring coupled to the means for controlling flow.

Example 34 includes the apparatus of example 31, wherein the means for evacuating includes one or more means for compressing to compress the fluid, the one or more means for compressing selectively configured between a series arrangement and a parallel arrangement.

Example 35 includes the apparatus of example 34, further including means for supplying air coupled to the means for evacuating, the means for supplying air to power the one or more means for compressing.

Example 36 includes the apparatus of example 31, further including means for storing coupled to the means for evacuating, the means for evacuating to store the compressed fluid in the means for storing prior to pumping the compressed fluid to the means for containing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to evacuate fluid from a first location, the apparatus comprising:
a vent fluidly coupled to the first location; and
a valve evacuation system fluidly coupled between the vent and a second location, the valve evacuation system to compress the fluid from the first location and pump the compressed fluid to the second location, the first location corresponding to a cylindrical passageway of a valve, the valve positioned along a pipe, the second location corresponding to the pipe upstream of the valve.

2. The apparatus of claim 1, wherein the valve is a double block-and-bleed valve.

3. The apparatus of claim 1, wherein the valve evacuation system includes compressors to compress the fluid, the compressors switchable between a series arrangement and a parallel arrangement.

4. The apparatus of claim 3, further including a portable air supply coupled to the valve evacuation system, the portable air supply to power the compressors.

5. The apparatus of claim 1, wherein the valve is a first valve, further including a second valve coupled to a first portion of the pipe, the first portion upstream of the first valve, the valve evacuation system fluidly coupled to the pipe via the second valve.

6. The apparatus of claim 1, wherein the valve includes:
a valve body; and
a ball rotatable within the valve body, the cylindrical passageway extending through the ball, the ball including a hole extending from the cylindrical passageway to an outer surface of the ball, the hole to fluidly couple the cylindrical passageway to the vent.

7. The apparatus of claim 1, wherein the valve evacuation system is to compress the fluid from the first location when the valve is in a closed position, the valve to restrict flow of the fluid through the pipe when the valve is in the closed position.

8. A method comprising:
fluidly coupling a vent to a cylindrical passageway of a valve, the valve positioned along a pipe; and
fluidly coupling a valve evacuation system between the vent and a high-pressure region in the pipe upstream of the valve, the valve evacuation system to compress fluid from the cylindrical passageway and pump the compressed fluid to the high-pressure region.

9. The method of claim 8, wherein the valve evacuation system includes compressors to compress the fluid, the compressors switchable between a series arrangement and a parallel arrangement.

10. The method of claim 9, further including coupling a portable air supply to the valve evacuation system, the portable air supply to power the compressors.

11. The method of claim 8, wherein the valve evacuation system compresses the fluid when the valve is in a closed position.

12. An apparatus to evacuate fluid from a valve, the apparatus comprising:
a vent fluidly coupled to a cylindrical passageway of the valve, the valve positioned along a pipe; and
a valve evacuation system fluidly coupled between the vent and a high-pressure region in the pipe upstream of the valve, the valve evacuation system to compress the fluid from the cylindrical passageway and pump the compressed fluid to the high-pressure region in the pipe.

13. The apparatus of claim 12, wherein the valve is operable between an open position and a closed position, the valve evacuation system to compress the fluid from the cylindrical passageway when the valve is in the closed position.

14. The apparatus of claim 13, wherein the valve evacuation system determines whether the valve is in the closed position or the open position based on measurement data from a sensor coupled to the valve.

15. The apparatus of claim 12, wherein the valve evacuation system includes compressors to compress the fluid, the compressors switchable between a series arrangement and a parallel arrangement.

16. The apparatus of claim 15, further including a portable air supply coupled to the valve evacuation system, the portable air supply to power the compressors.

17. The apparatus of claim 12, further including a storage unit coupled to the valve evacuation system, the valve evacuation system to store the compressed fluid in the storage unit prior to pumping the compressed fluid to the high-pressure region.

* * * * *